United States Patent [19]
Benian

[11] Patent Number: 5,203,998
[45] Date of Patent: Apr. 20, 1993

[54] PERMANENT BACKWASHABLE FILTER STRUCTURE

[75] Inventor: Robert Benian, West Bloomfield, Mich.

[73] Assignee: Benian Filter Company, Inc., West Bloomfield, Mich.

[21] Appl. No.: 900,003

[22] Filed: Jun. 17, 1992

[51] Int. Cl.[5] ............................................. B01D 27/06
[52] U.S. Cl. ................................ 210/493.5; 210/487; 210/493.1; 210/321.77; 210/321.86
[58] Field of Search ................ 210/798, 493.5, 321.77, 210/321.86, 487, 493.1, 445, 346, 500.1, 391, 333.1, 333.01; 55/521

[56] References Cited
U.S. PATENT DOCUMENTS

| | | | |
|---|---|---|---|
| 2,907,408 | 10/1959 | Engle et al. | 210/493.1 |
| 3,022,861 | 2/1962 | Harms | 210/493.1 |
| 3,647,071 | 3/1972 | Lamort | 210/487 |
| 4,186,099 | 1/1980 | Henschel, Jr. et al. | 210/487 |
| 4,552,657 | 11/1985 | Ogawa | 210/493.1 |
| 4,588,464 | 5/1986 | Miyagi et al. | 210/493.2 |
| 4,735,720 | 4/1988 | Kersting | 210/493.5 |
| 4,954,255 | 9/1990 | Müller et al. | 210/493.5 |
| 5,104,534 | 4/1992 | Branchcomb | 210/493.5 |

Primary Examiner—Mary Lynn Theisen
Assistant Examiner—Ana M. Fortuna
Attorney, Agent, or Firm—Harness, Dickey & Pierce

[57] ABSTRACT

A liquid-cleaning filtering system with distillation capability has twin permanent filter assemblies, each utilizing a wire mesh filter cartridge which is backwashed using an internal sprayer nozzle assembly. During the normal operation of the filter cartridge, which is located in a pressurizable inverted bell housing, contaminates are filtered through a sheet of wire mesh arranged in a star configuration on a frame structure within the filter cartridge. The liquid filtering system is especially adapted for use in dry cleaning operations where a layer of diatomaceous earth and a layer of activated carabon deposited are on the wire mesh at the start of normal forward flow. Contaminates collect on this filter bed, thus cleaning the dry cleaning solvent. During the system's backwash cycle, filtered solvent previously collected in a steel reservoir is pressurized to provide a powerful head of pressure for backflushing each filter cartridge through its own sprayer nozzle assembly which reciprocates inside the cartridge. The high-pressure spray vigorously cleans the wire mesh of all suspended contaminants and filter bed particles. The backflushed dry cleaning solvent is directed to the distillation system which separates the solvent from the contaminants by the evaporation method.

25 Claims, 7 Drawing Sheets

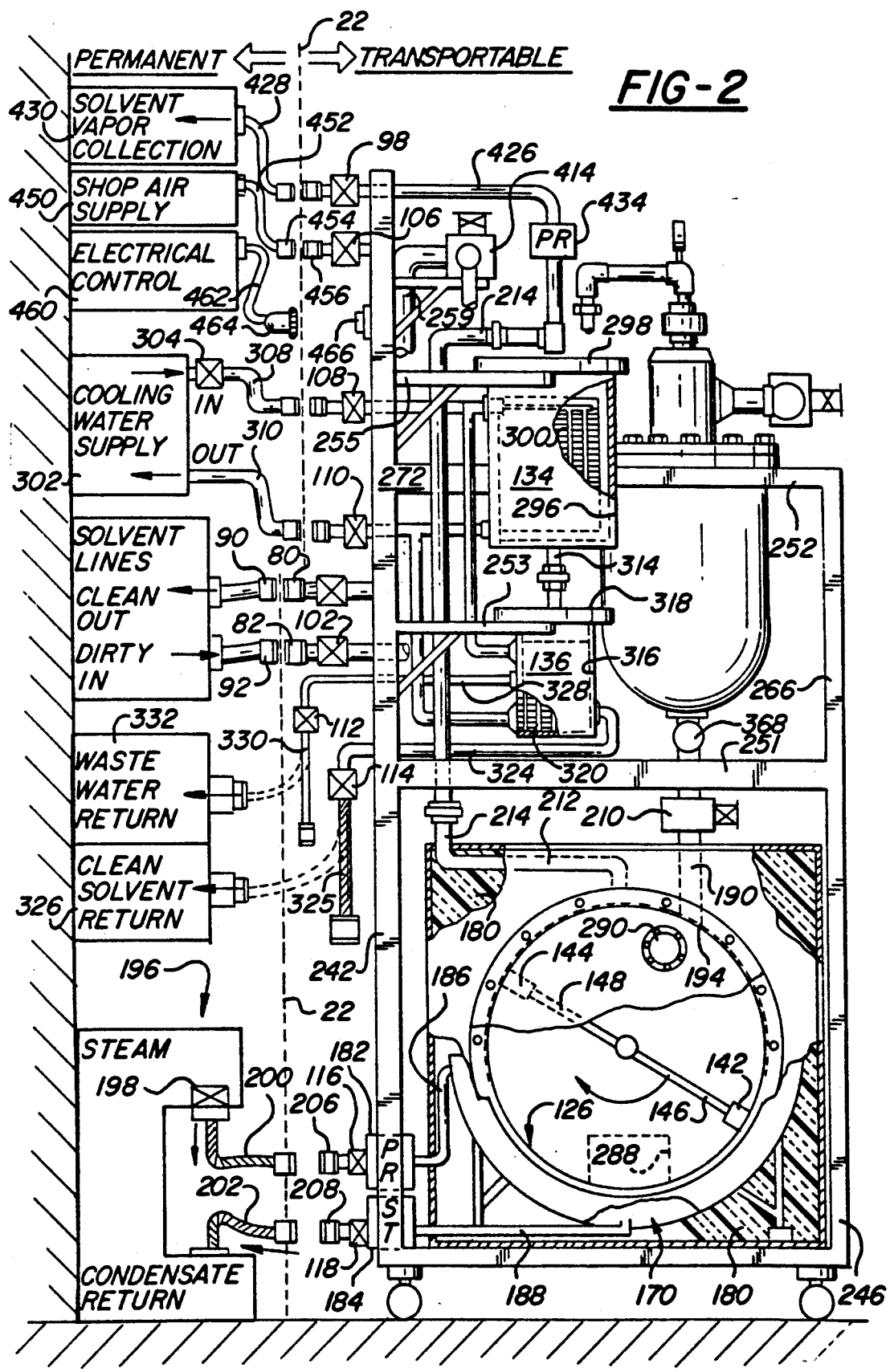

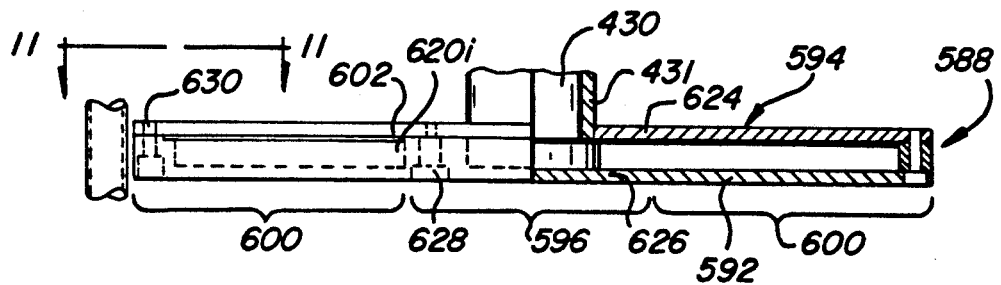
FIG-10
FIG-11
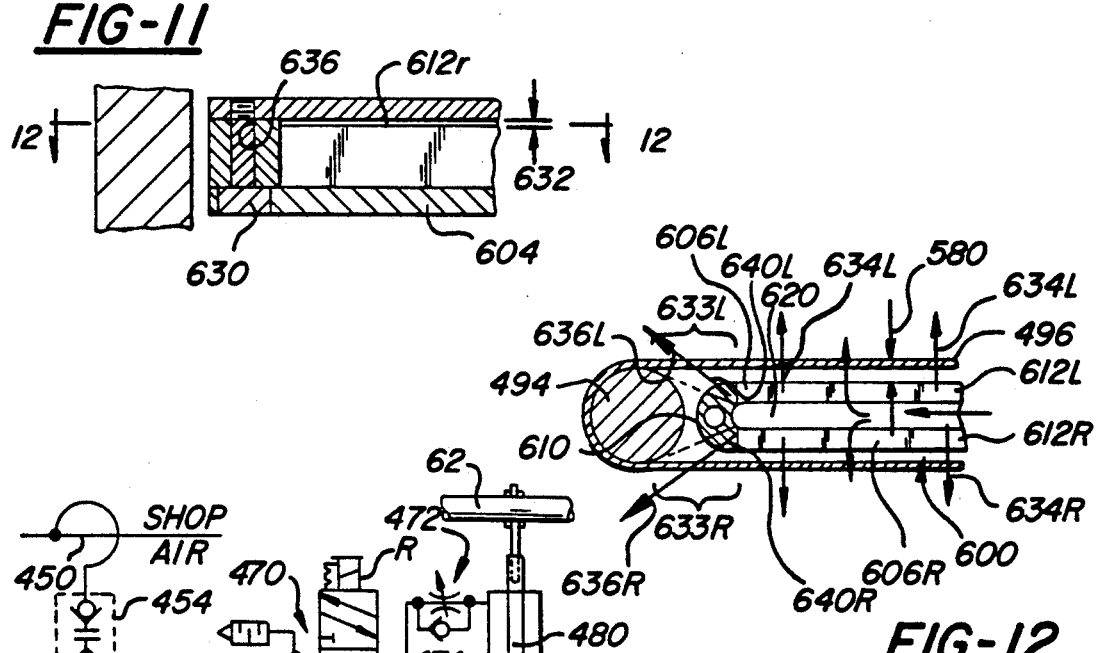
FIG-12
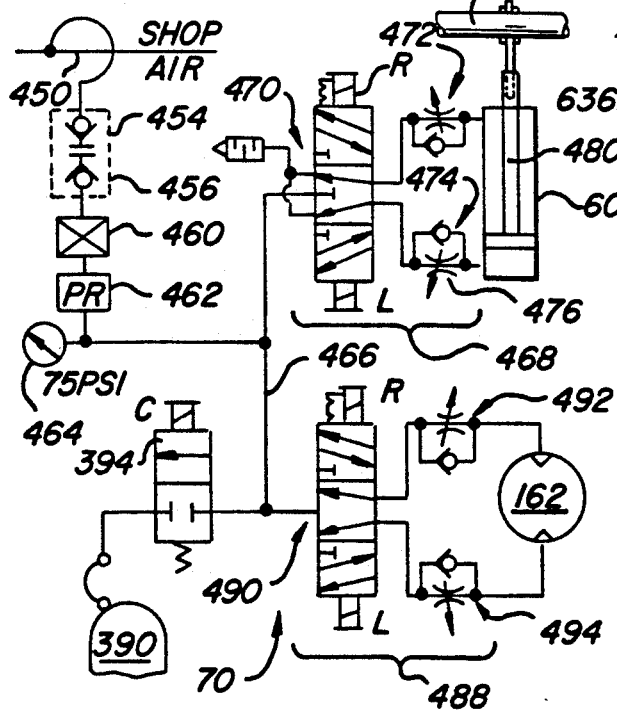
FIG-3

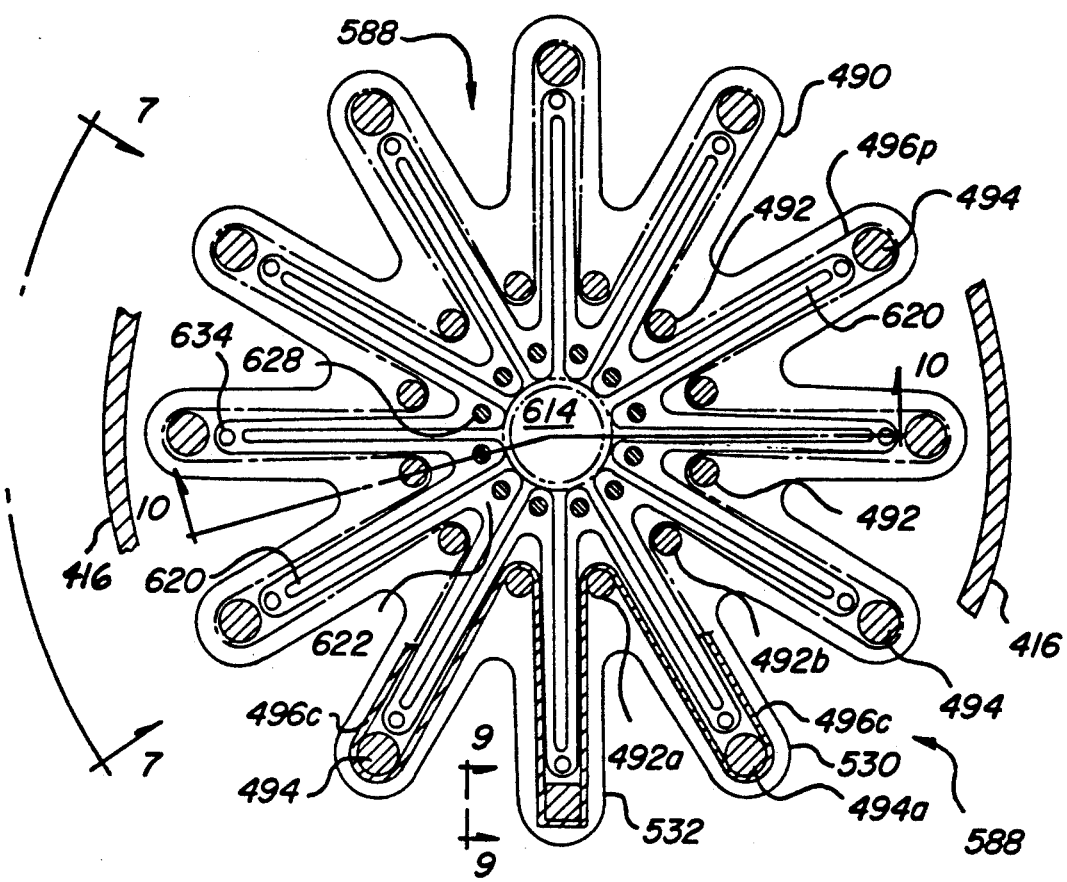
FIG-6
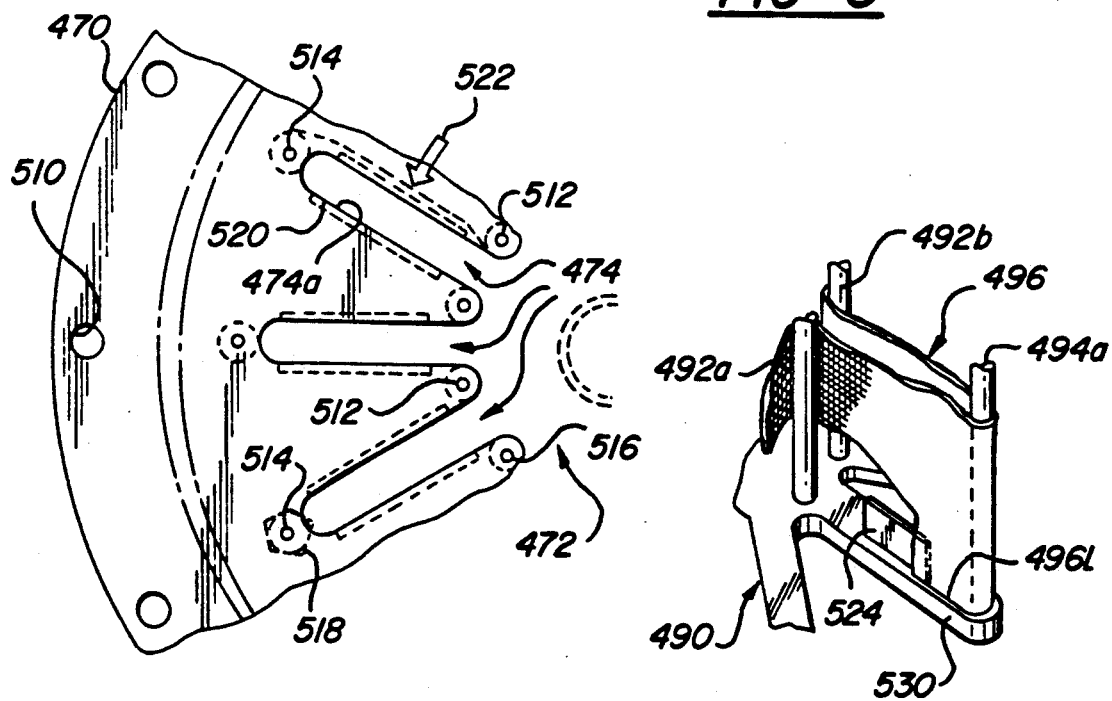
FIG-7
FIG-8

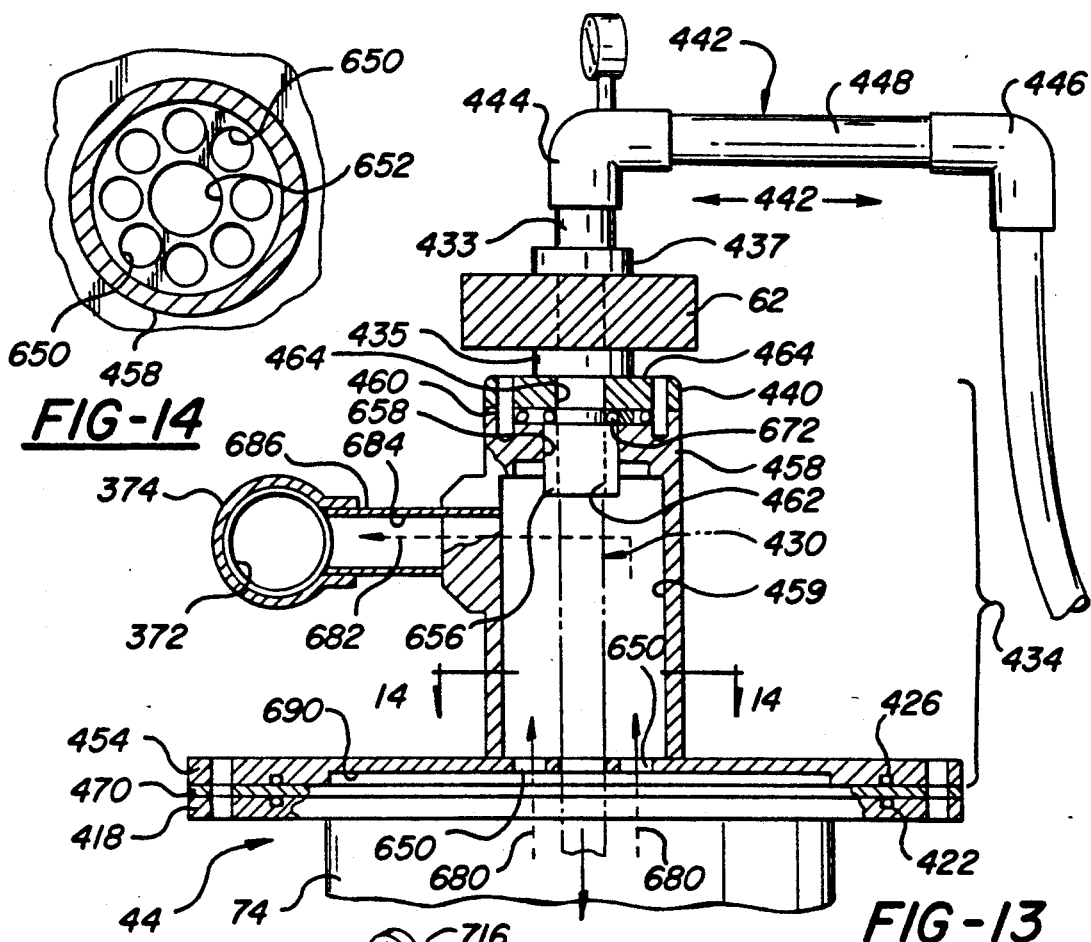
FIG-14
FIG-13
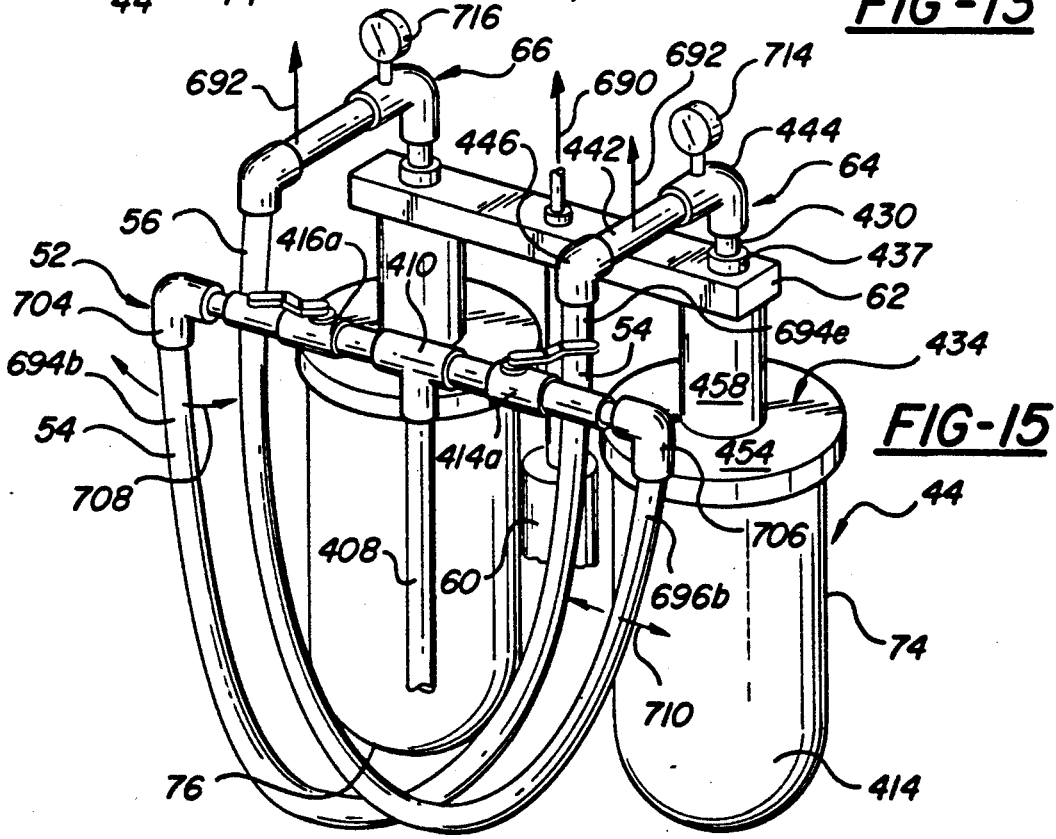
FIG-15

PERMANENT BACKWASHABLE FILTER STRUCTURE

BACKGROUND OF THE INVENTION

1. Field of the Invention

The invention relates, in general, to transportable liquid filtering and cleaning systems, and in particular to permanent filter systems that utilize one or more permanent filter cartridges that can be backwashed through the use of reciprocating high pressure sprayer assemblies, and to the ancillary equipment used with such cartridges and sprayer assemblies.

2. Description of the Related Art

Filtration systems for cleaning contaminated liquid have long been used in commercial and industrial operations where liquids, such as solvents, need to be continuously cleansed during a particular process, such as dry cleaning clothes at a professional dry cleaner. During normal operating conditions, the liquid to be filtered generally passes through a filter cartridge that is made of either disposable paper or wire mesh for collecting the contaminants, generally solids, that are suspended within the liquid. Typically, only by maintaining the level of suspended solids and other contaminants within the liquid below a certain level, can the machinery that utilizes the liquid operate properly or for its expected number of cycles. After a number of hours or cycles of running a given industrial or commercial process, the filters must be changed in order to keep the percentage of soluble soil within the liquid at a desired low level. For example, in dry cleaning operations in order to properly cleanse the clothes, it is very important to maintain a certain minimum level of purity of the dry cleaning solution in order to achieve the desired cleaning level and also to remove odors from the clothes.

Dry cleaning operations typically use perchlorethylene combined with a small amount of surfactants and water as the liquid solvent to cleanse a variety of different types of clothing articles during a typical dry cleaning process. In conventional dry cleaning systems, the solvent is cleansed by a filter bed including a layer of paper or wire mesh material, covered with a very thing layer of diatomaceous earth which, in turn, is covered with a very thin layer of even finer activated carbon particles. This filter bed removes contaminates, which are primarily colloidally suspended solids that are washed from the clothes, and also removes various acids and odors that are dissolved in the solvent. In known filter systems, a filter assembly using replaceable cartridge filters that must be manually installed and removed from the filter assembly are utilized. The problem with servicing this type of filters are several. First, the dry cleaning system must be shut down during this filter-changing period for a fair amount of time, thus increasing downtime and decreasing overall productivity of the dry cleaning operation. Second, the disposable filters and the particulate resulting from a conventional distillation process are considered hazardous, since perchlorethylene is listed by federal environmental regulations as a toxic substance, even at relatively low concentration levels. Accordingly, they, too, must be disposed of in a manner consistent with hazardous waste regulations. Manually changing filters not only increases exposure to these solvents, but also is messy due to the remnants of the used powdery filter bed materials which remain caked on the filters, including the very fine activated carbon powder. Thus, the necessary step of changing the disposable filter cartridge is quite unpleasant. Yet, if the operator of the dry cleaning system elects to run the dry cleaning washer when the solvent is contaminated to an unacceptable level, the clothes will not be properly cleaned. Thus, the dry cleaning operators must follow a schedule and change the filters on a regular basis, even though it is very unpleasant to do, in order to maintain quality in a dry cleaning operation.

It would be preferable to have a liquid filter cleaning system that would minimize the down time of the dry cleaning process by reducing the time required to service the filter cartridges. It would also be preferred to have a liquid filter cleaning system with a reusable filter that could be easily and repeatedly reconditioned to its original pristine state of cleanliness. In other words, it would be very desirable to be able to successfully remove all contaminants, diatomaceous earth and activated carbon from a permanent filter before beginning the next normal dry cleaning operation, which commences with the reestablishment of the filter bed, by adding fresh diatomaceous earth/activated carbon materials on a permanent filter sheet.

Some manufacturing process that employ liquids, such as solution, and the like, utilize complicated liquid-cleaning systems that not only filter out the contaminants picked up by the liquid in the process, but also distill the sludge that is created when the system's filters are backwashed. The distillation systems are generally large in size and have different types of vessels for handling the liquids or vapors. These vessels are elaborately interconnected by piping and permanently anchored to the floor or mounted to a support structure or trusses of the building. For example, in professional dry cleaning establishments, the liquid-cleaning system not only the filtering equipment, but also distillation equipment which normally includes a still (that is the reservoir in which the solvent is heated), a heating system, storage tanks, separators, condensers, various shut-off valves, motor-driven pumps and large contaminant traps, such a lint strainers. When the liquid system is down for the failure of or complex servicing of any one of these components, the entire dry cleaning operation must cease until the entire liquid-cleaning system is back to a fully operational condition. A lengthy downtime of the solvent cleaning system in a dry cleaning establishment wrecks havoc on business since all operations at the particular establishment are suspended. In order to meet commitments to customers, the clothes must be dry cleaned elsewhere and returned.

It would, thus, be desirable to have a liquid-cleaning system that can be easily transported as a unit, and is ruggedly constructed to withstand the inevitable vibrations that occur when bulky equipment is shipped by truck. Further, it would be highly desirable to make it possible to rapidly decouple and recouple the unit to the commercial or manufacturing operation it is used with. In this way, when one or more components of the liquid-cleaning system needed service that could not be rapidly performed on-site, it would be possible to have an identical secondary liquid-cleaning system available that could be quickly interchanged with the primary liquid-cleaning system, which would then be serviced at the factory. This arrangement would permit the down time of the dry cleaning operation to be minimized when factory service or reconditioning of any portion of the liquid-cleaning system is required.

In light of the foregoing needs, one primary object of the present invention is to provide a liquid-cleaning system that employs a filter assembly having a permanent filter cartridge which can be reconditioned through backflushing to an original pristine state. An object of the invention is to provide a large surface area to unit volume ratio for such a permanent filter cartridge.

A related object of the present invention is to provide a compact sprayer nozzle structure which fits within a permanent mesh filter cartridge and provides high velocity jets of fluid for efficiently backflushing the mesh filter to reduce backflushing cycle time to a minimum. A related object of the present invention is to provide a common lifting mechanism for raising and lowering the compact sprayer nozzle structure.

A further object of the present invention is to provide an arrangement for doubling the capacity of a permanent filter system for liquids to be cleaned by using two permanent filter assemblies in tandem which share common components to reduce the overall costs of the system while providing increased filtering capacity.

Another related object of the present invention is to provide a common backwash manifold for supporting a tandem flexible arcuate hose arrangement to interconnect to the twin reciprocating sprayer nozzle assemblies.

Another primary object of the present invention is to provide a compact, transportable liquid-cleaning system including one or more permanent filter assemblies and a distillation system for processing spent solvent produced by backflushing dry cleaning filter beds which include diatomaceous earth and activated carbon powder.

A related object of the present invention is to provide a liquid-filtering system and distillation system including still reservoir, steam heating system, water-cooled condenser and separator lines, all mounted in a compact portable base frame and support structure mounted on wheels.

A related object of the present invention is to provide a self-contained fluid-cleaning system including permanent filters and a distillation system with control valves and quick-disconnect fittings to permit the rapid interconnection or upcoupling of steam, solvent, air and/or electrical supply or control lines and solvent vapor recovery lines to permanently installed process equipment, especially dry cleaning washer systems and solvent vapor recovery systems.

These and other objects, features and advantages of the present invention will become clear upon reading the following summary and detailed description of the liquid-cleaning system and methods of the present invention.

SUMMARY OF THE INVENTION

The novel liquid-cleaning system and methods of the present invention utilize a number of components, assemblies and subsystems believed to be novel. These include a multiple-finger sprayer structure which is designed to be put inside of and reciprocate within a novel pressurizable permanent filter cartridge having corresponding sections with finger-like chambers therein. These elongated finger sections of the cartridge are sometimes called corrugated sections or pleated sections.

The novel filter cartridge and reciprocating sprayer nozzle structure are located within a novel pressurizable permanent filter assembly resembling a bell jar. This assembly includes a cartridge cover assembly having a head section provided with dual concentric passages. The center passage receives and guides the elongated pipe assembly connected to the novel sprayer structure.

A preferred filtering system of the present invention makes use of dual permanent filter assemblies of the type just described and a common lift mechanism and a common backwash manifold and hose subsystem connected via the elongated pipes to the reciprocating sprayer nozzle structure found within each permanent filter assembly. Dual arcuate flexible hose connections are made between the backwash manifold and the reciprocating sprayer nozzle assemblies in a manner which minimizes space requirements while still ensuring the hoses will not interfere with one another or be strained while moving up and down during the backwash cycle.

The liquid-cleaning system of the present invention is preferably compact and portable by virtue of being installed upon a wheelable base and support structure. Quick coupling and decoupling of the liquid-cleaning system is provided by routing all lines to a common side of the superstructure, and providing shut-off valves and quick-disconnect fittings or couplings on all lines that are to be attached to permanently installed lines leading to the process equipment to be serviced by the liquid-cleaning system of the present invention.

The transportable liquid-cleaning system of the present invention preferably includes a distillation system. It has a still which is heated to vaporize contaminated solvent to be recovered after backwashing the permanent filter assemblies. The distillation system includes a condenser, separator and solvent mixer located in the still. Vapor recovery lines are also provided at all vapor escape points, namely the still, backwash reservoir and condenser. These prevent release of solvent vapor to the atmosphere during routine operation of the liquid-cleaning system of the present invention.

Armed with this overview, the following summaries of specific aspects of the present invention will be more readily understood.

A key to successful use of permanent filters is the ability to repeatedly clean them to their original pristine state. This object is met, according to first aspect of the present invention, by a nozzle structure for producing multiple thin streams of liquid for backwashing a permanent filter. The nozzle structure is preferably arranged in a star configuration and produces multiple distinct small streams of liquid flowing at high velocity, with each stream being in a different location. Most, if not all, streams are preferably in the same general plane. The nozzle structure designed for backwashing a filter structure also arranged in a corresponding star configuration. The nozzle structure comprises: a central manifold section, and at least four elongated finger sections extending radially outwardly from the central manifold section, and equally angularly spaced from one another in a common plane. The central manifold section has a central manifold chamber with a fluid inlet port connected thereto.

Each elongated finger section has an elongated chamber therein enclosed by the wall portions of the finger section. Each finger section also has at least two openings in the finger section which are in fluid communication with the elongated chamber of the finger section which, in turn, is in fluid communication with the central manifold chamber. The fluid flow capacity of the elongated chamber of each finger section is made significantly greater than the capacity of the openings in the finger sections, so that the openings present a high resistance to fluid flow. This arrangement enables back pressure to develop in the elongated chambers of each finger section so that fluid is expelled from the openings or slots in each finger section at relatively high velocity. The openings may be distinct tiny holes and arranged in a line. But preferably the openings are each an elongated slot in opposed side wall portions of its respective finger section. A pipe structure is preferably used for supporting the nozzle structure for reciprocation with the permanent filter cartridge. The pipe structure has a central axis coincident with the axis of the nozzle structure and is preferably threaded into the central manifold section of the nozzle structure.

To provide a high efficiency, compact, permanent filter cartridge, there is provided, according to a second aspect of the present invention, a pressurizable filter cartridge apparatus having a central axis and a sheet of permanent mesh filter bed material arranged therein in a star configuration. This configuration increases the ratio of surface area to unit volume for the cartridge apparatus. The cartridge is preferably assembled and comprised of the following components: (1) a top cartridge plate provided with at least four elongated openings arranged in a star configuration; (2) a bottom cartridge plate having at least four elongated finger sections arranged in a star configuration; (3) a plurality of outer tie rods for interconnecting the top and bottom cartridge plates; (4) a plurality of inner rods for interconnecting the top and bottom cartridge plates; (5) a sheet of permanent filter bed material arranged in a star configuration so as to have a number of pleated sections, with the filter sheet passing on the outer side of the outer tie rods and the inner side of the inner tie rods when viewed from the center of the star configuration, so as to form an enclosed inner volume extending between the top and bottom filter cartridge plates. The filter cartridge apparatus preferably includes (6 and 7) top and bottom sealing means for closing leakage paths between the top and bottom edges of the sheet of filter bed material. The cartridge plates, tie rods, a sheet of permanent bed material, and sealing means are all arranged, sized and interconnected in a manner which enables the sheet of filter material to filter liquid pressing against the outer side of the sheet up to 15 psig or more. This configuration also allows the sheet to be backwashed by liquid flowing from the enclosed inner volume through the sheet to the region on the outside of the sheet.

The just-described permanent filter cartridge assembly is pressurizable during normal filter operations. This vastly increases the filter capacity over what could be obtained without pressurizing the liquid to be filtered.

A novel third aspect of the present invention is that the foregoing unique pressurizable permanent filter apparatus which makes use of the reciprocating nozzle structure and permanent filter cartridge assembly. According to this third aspect, there is provided a backwashable filter assembly having a permanent filter mesh material disposed about support members in a corrugated configuration, preferably a star configuration to increase the filter surface area to unit volume ratio. The permanent filter apparatus includes a filter cartridge assembly as described, a nozzle structure as described, and a reciprocatable structure for supporting the nozzle structure for movement back and forth which keeps the small orifices of the finger sections of the nozzle structure in close proximity to the sheet of permanent mesh filter material. This backwashable filter assembly includes a filter case assembly formed from a filter housing, preferably resembling an inverted bell jar with an annular flange at the open end thereof, and a filter cover structure including a flat cover plate which sealingly engages the filter cartridge assembly and the annular flange of the filter housing. The filter cover structure preferably includes center bores passing therethrough supporting the nozzle structures for transverse movement.

While the permanent filter assembly just described is useful, having a plurality of such permanent filter assemblies in a single filter system is desirable to double the capacity of the filter system. To achieve this result, a novel common lift mechanism for concurrently moving a pair of reciprocating sprayer nozzle assemblies was developed. A novel common backwash manifold with dual arcuate hoses occupying very little space and connected to reciprocating sprayer nozzle assemblies was developed. According to this fourth aspect, there is provided a system for backwashing at least two permanent filter assemblies comprising: (1) a manifold assembly having a main fluid supply member and first and second fluid supply members extending outwardly therefrom; (2 and 3) a plurality of permanent filter assemblies, each including a pressure vessel and a permanent filter cartridge located within the pressure vessel; and (4 and 5) a plurality of reciprocatable high pressure liquid backwash assemblies located almost entirely within and slidably mounted to the filter assembly for cleaning the filter cartridge therein each including a support pipe member; (6) the common lift mechanism including a tie bar coupled in fixed relation to the pipe members; and (7) the aforementioned common manifold connected by arcuate hoses to the backwash assemblies.

A fifth aspect of the present invention relates to the filter cover assembly used to receive the reciprocatable pipe member attached to the sprayer nozzle structure. This filter cover assembly includes guide means for receiving the fluid delivery pipe and a plurality of ports arranged in a filter cover plate around the guide means for permitting liquid to pass through the cover plate as it leaves the permanent filter cartridge. These dual concentric passages allow backwash liquid to enter, and filtered liquid to escape from the inner volume of the filter cartridge assembly.

Several other important aspects of the present invention exist, including the methods for using the above-described equipment of the present invention. The aforementioned aspects, objects and advantages of the present invention will be better understood by examining the preferred embodiments of the present invention illustrated in the Figures and by studying the detailed descriptions and claims found below.

BRIEF DESCRIPTION OF THE DRAWINGS

In the drawings, where the same reference numerals indicate similar components or features in the various Figures:

FIG. 2 is a simplified left side view, shown partially in block diagram form on the right side of dashed vertical line 21 of the Figure 1, permanent filter liquid-cleaning system, showing the various connectors employed to hook up the transportable FIG. 1 system to a conventional, permanently installed solvent system which produces a liquid solvent to be filtered and distilled;

FIG. 3 is a schematic diagram showing the air control system used in a preferred embodiment of the FIG. 1 system of the present invention;

FIG. 6 is a cross-sectional view taken along line 6—6 of FIG. 5, showing the star configuration of the permanent filter cartridge and sprayer nozzle structure;

FIG. 7 is a fragmentary top view of the top plate of the filter cartridge assembly, showing a pie-shaped region of the top plate generally indicated by line 7—7 in FIG. 6;

FIG. 8 is an enlarged perspective view, partially broken away, of the construction of an area of the lower portion of the filter cartridge assembly, generally identified by line 8—8 in FIG. 4, showing how the permanent filter material, namely wire mesh, is wrapped around one outer tie rod and two adjacent inner tie rods;

FIG. 9 is a greatly enlarged fragmentary perspective view of one special outer tie rod connected to the bottom cartridge plate, as indicated generally at line 9—9 of FIG. 6, where the side edges of the wire mesh sheet material forming the permanent filter material are overlapped and tack welded to the tie rod;

FIG. 10 is a side elevational view, partially in cross-section, of a preferred sprayer nozzle structure of the present invention, as seen from line 10—10 of FIG. 6, illustrating two long, very thin slots for producing two thin sheets of high velocity spray used to clean the permanent filter cartridge assembly during the backwashing step;

FIG. 11 is an enlarged fragmentary side cross-sectional view illustrating the outer portion of the elongated finger section of the sprayer nozzle indicated by line 11—11 of FIG. 10;

FIG. 12 is an enlarged fragmentary cross-sectional view taken along line 12—12 of FIG. 11, illustrating how the elongated sprayer slots are sculpted to ensure mesh material adjacent the outer tie rod is backwashed;

FIG. 13 is an enlarged side elevational view in partial cross-section of the filter cover subassembly, generally indicated by line 13—13 of FIG. 5, shown in position with respect to the filter housing assembly;

FIG. 14 is an enlarged cross-section view, taken along line 14—14 of FIG. 13, showing the fluid passageways which enable filtered liquid within the inside of the filter cartridge to pass through the bottom plate of the filter cover assembly; and FIG. 15 is a simplified perspective rear view of a preferred backwash manifold structure with dual hanging hoses for supplying backwash solvent to the dual reciprocating nozzle assemblies supported on a common tie bar which is raised and lowered by a single lift mechanism.

DETAILED DESCRIPTION OF THE PREFERRED EMBODIMENTS

In FIGS. 1 through 15, which will now be described in detail below, preferred embodiments of the liquid-cleaning system of the present invention and its various subsystems, assemblies and components are explained. It should be appreciated that this description is of only one implementation of the system and methods of the present invention, including various parts thereof, and that other implementations and arrangements are possible. Specifically, the equipment and methods disclosed here may be modified and implemented in various other ways without departing from the proper scope of the present invention covered by the claims below.

Figure 1:
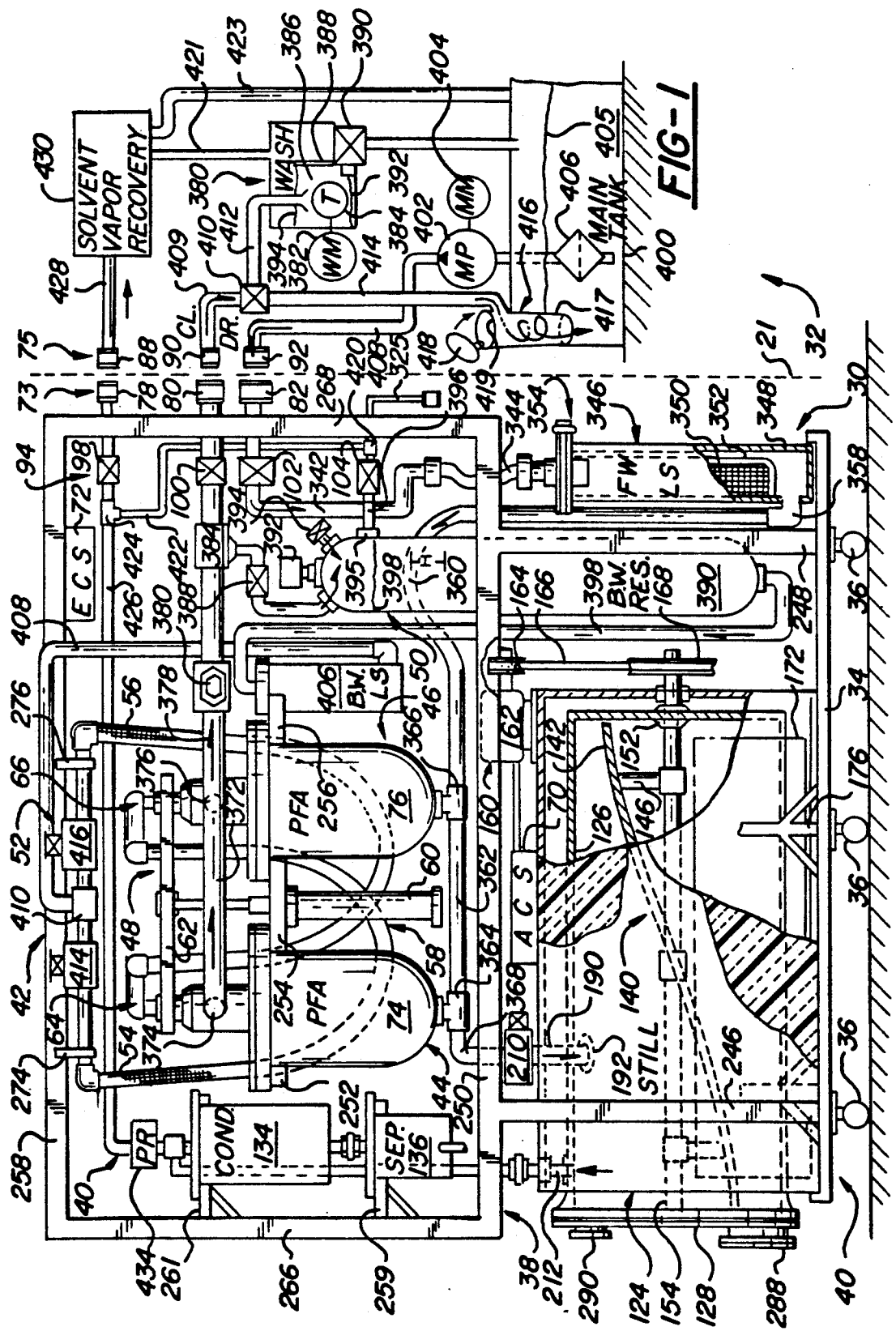
FIG. 1 is a simplified front view, shown partially in block diagram form on the left side of vertical dashed line 21, of one embodiment of a transportable permanent filter liquid-cleaning system of the present invention which includes, a rectangular housing containing a still, two permanent mesh filter assemblies serviced by a single reciprocating backwash header/nozzle assembly, and other components, and, on the right side of dashed line 21, conventional dry cleaning washer equipment with which the liquid-filtering system of the present invention may be used is shown.

FIG. 1 is a simplified front view of a transportable permanent filter liquid-cleaning system 30 of the present invention which may be connected to a conventional dry-cleaning washer system 32 shown on the right side of vertical dashed line 21 in FIG. 1. The liquid-cleaning system 30 includes a base frame 34 on six wheels 36 supporting a superstructure 38 for supporting various components. System 30 includes a distillation system 40; permanent filtering system 42 provided with first and second identical permanent filter assemblies (PFAs) 44 and 46; a backwash reservoir subsystem 50; a backwash header and delivery subsystem 52. Subsystem 52 includes flexible hoses 54 and 56 to provide backwash solvent received from subsystem 50 to PFAs 44 and 46, respectively. The PFAs 44 and 46 are serviced by a common lift mechanism 58 which forms part of system 30. Mechanism 58 includes a pneumatic cylinder 60 and tie bar 62 to raise and lower reciprocating sprayer nozzle assemblies 64 and 66. Assemblies 64 and 66 form part of their respective PFAs and are largely hidden in FIG. 1 within the housings 74 and 76 of their respective PFAs. It is the sprayer nozzle assemblies 64 and 66 that are actually connected to flexible hoses 54 and 56, respectively.

The liquid-cleaning system 30 also includes an air control system 70 (shown as a box labelled "ACS" in FIG. 1). Alternatively, an electrical control system 72 (represented by the box labelled "ECS" in FIG. 1) may be provided. The ACS 70 or the ECS 72 provide power-assisted or automatic operation of various parts of the system 30. The degree of automation can be varied as will later be explained in more detail.

It is preferred, but not required, that the liquid-cleaning system 30 be quickly connectable to and disconnectable from the permanent equipment 32 it services. For this purpose and found in the upper right hand corner of FIG.1 on either side of dashed line 21, are a first set 73 of quick disconnect fittings, represented by fittings 78, 80 and 82 and a second set 75 of quick disconnect fittings 88, 90 and 92 are provided on the system 30 and equipment 32. A set 94 of shut-off valves 98, 100, 102, 104, to the left of dashed line 21, shown in FIG. 1, and shut-off valves 106 through 118, shown in FIG. 2, may be provided to selectively close all lines prior to decoupling them at the quick-disconnect fittings. These quick-disconnect fittings or couplers may be of any conventional or suitable type, including pipe unions, as long as they are rated to handle the liquid or vapor indicated as flowing through it.

The Distillation System and Superstructure

The distillation system 40 includes an internally insulated, generally rectangular housing 124 made of sheet metal or other suitable material containing a cylindrical reservoir the still 126. The still 126 is preferably made from 0.25 inch thick stainless steel, and is arranged so that its axis is horizontal as shown best in FIG. 1. Still 126 may be any suitable such as 40 to 60 gallons in capacity. In any event, the capacity of still 126 should be greater than the sum of the capacities of PFAs 44 and 46 and the backwash reservoir to be described shortly. In the prototype of system 30, the capacity of still 126 is about 50 gallons. Still 126 has a removable access cover 128 bolted onto an annular flange 130 with a gasket therebetween to make the seal at the cover liquid and vapor tight. The system 40 also includes a water-cooled condenser assembly 134 which is used to condense distilled vapor to a liquid distillate form, and a separator assembly which is used to separate the distillate into solvent and water, respectively. The access cover 128 to still reservoir 126 may include cover 288 at the bottom center bottom of the barrel 126. The cover 288 is opened to remove the powdery sludge which remains at the end of the distillation cycle. The cover may also include a flange-mounted glass sight port 290 to check on the internal condition of the solvent being distilled within the tank.

The distillation system 40 also includes a double-helix-like mixing screw 140 inside the still 126. Screw 140 has two mixing blades 142 and 144, each supported by three arms 146 and 148, respectively, that are driven by shaft 150 journalled into ball-bearing bushings 152 and 154 at right and left ends of the still 126. The shaft 150 is driven by drive system 160 including a motor 162. A drive pulley 164 on the motor shaft is connected by belt or chain 166 to pulley 168 journalled and pinned to mixer shaft 150.

Contained in rectangular housing 124 is a heating system 170 which is preferably powered by steam, but may be electric heat provided by resistive heating unites, if desired. The system 170 is made of a semi-cylindrical jacket 171 or shell welded at the edges thereof to the lower half of the outside surface of metal reservoir 126. This shell creates an enclosed semi-cylindrical steam chamber on the jacket 171 and still 126 is supported by suitable mounting brackets 176 and insulated from contact with the housing 124 by thermal insulation 180, as illustrated by the various cut-away portions of housing 124 where the insulation 180 may be seen. The insulation may be fiberglass, rockwool, or any other suitable high-temperature, non-flammable insulation material. When steam is used as a heat source, a pressure regulator 182 and steam trap and check valve assembly 184 are preferably connected to inlet line 186 and outline line 188 leading to the half-shell steam chamber 172.

Contaminated solvent to be distilled in reservoir 126 is dumped into still 126 by conduit or pipe 190 projecting through a flange-mount fitting 192 on the outside of the still 126 at upper location 194 best seen in FIG. 2.

Shut-off valves 116 and 188 are opened to allow steam from building supply 196 to flow through hose assembly 200 and coupling 206, through pressure regulator 182 to supply line 186 and into steam chamber 172. Spent steam or condensate is returned through bottom conduit 188 to steam trap 184. From there it flows through shut-off valve 118 through coupling 208 and hose assembly 202 to the condensate return line of the building steam system.

When heat is applied to the heating chamber 172, the contaminated solvent boils off, and the resulting vapor escapes through solvent vapor line 212. Line 212 leads upwardly out of still 126 at location 214 to the condenser assembly 134, which will be described shortly.

A number of components may advantageously be secured, if desired, to bulkhead supports or other rigid members of the superstructure 38. Superstructure 38 may include the following components: vertical base support base member 242 through 248, horizontal support members 250 through 262 and upward vertical support members 266 through 272. Numerous pipe clamps, such as clamps 274 and 276 at the top of FIG. 1, may be used as necessary to support the lines, valves and other components of system 30 to the members of superstructure 38. To some extent, the piping or other lines used between various subsystems and components provides the rigidity and strength necessary to support selected components. It is, thus, possible, if desired, with well-planned placement and interconnection of housings, canisters and piping to largely or entirely eliminate use of or to greatly reduce the numbers of members or amount of material used in the superstructure 38.

FIG. 2 shows the condenser assembly 134 in more detail. The assembly 134 includes a canister or housing 296 and a cover 298. Inside the housing 296 is a heat exchanger 300 cooled by water delivered from the building or cooling water supply 302 through shut-off valve 304 and hose 308 to a set of couplings leading to shut-off valve 108 mounted to the superstructure member 272. Water returns back to block 302 through line 309, shut-off valve 110 to hose 310.

Boiled-off solvent vapor to be condensed is delivered via insulated line 214 to the inside of condenser housing 296. There vapor is condensed and exits via pipe 314 into separator assembly 136. Separator 136 consists of a canister 316, cover 318 and water-based heat exchanger 320 supplied by water from lines 308 and 310. In the dry cleaning process, the distilled solvent perchloroethylene (perc) is heavier than water, so the water settles below the perc. Thus, the perc exits canister 316 via return line 324 to shut-off valve 114 connected to hose 325 and is routed to a permanent distilled solvent return line represented by box 326. Return line 326 normally leads to the main solvent tank in the dry cleaning washer system.

The water which has settled on top of the perc exits out of canister 316 via pipe 328 to shut-off valve 112, which may be connected by hose 330 to return lines leading to a waste water collection point, represented by block 332.

Solvent Supply and Return Lines For The Permanent Filter Assemblies

As best seen in FIG. 1, dirty solvent to be filtered is provided to the permanent filter assemblies 44 and 46 via coupling 82 through shut-off valve 102 to line 342. From line 342, the dirty solvent passes through a flexible conduit or hose 344 leading to a forwardwash lint strainer assembly 346. This conventional lint strainer 346 includes a cylindrical metal canister 348, a cylindrical nylon cloth bag 350 supported externally by a cylindrical coarse plastic wire frame 352 of approximately the same size. Cover clamp mechanism 354 located at the top of the strainer assembly 346 allows the lint bag to be cleaned by hand periodically. Since the bag 350 is very large, this only needs to be done once in a great while.

Strained dirty solvent then exits canister 348 at line 358. Line 358 goes to a high point 360 a minimum distance "H" above horizontal pipe 362 leading to the T-couplings 364 and 366, which are in fluid communication with the bottom of housings 74 and 76 of permanent filter assemblies 44 and 46. Downwardly directed elbow 368 connects pipe 362 to control valve 210. Opening valve 210 permits solvent to be dumped into the still reservoir 126. As will be described later, valve 210 is normally opened only during the backwashing of the PFAs. The high point 360 of pipe 358 is utilized to ensure that, during the backwashing operation when control valve 210 is opened, contaminated solvent, including filter bed materials is taken by action of gravity to still 126 through pipes 368 and 190. Without the high point 360 and pipe 358, the backwashed solvent might run down into pipe 358 into lint strainer 346. The height "H" is selected to ensure this does not occur.

During normal filtering operation, the PFAs 44 and 46 provide filtered solvent through couplings 374 and 376 to common horizontal pipe 372. The filtered solvent flows in the direction indicated by arrows 378 through a double-window sight glass coupling 380 to pipe 382. Line 382 leads to the shut-off valve 100 and quick-disconnect coupling 80. The sight glass 380 allows the general clarity of the perc to be visually monitored. The clean perc is highly transparent, while perc containing high levels of contaminations or significant quantities of diatomaceous earth or activated carbon, which occurs when the filter bed is not fully formed upon re-start up of the system 30.

The Backwash Subsystem

The backwash subsystem 50 includes a pressurizable reservoir 390, that is preferably one to one and one-half times the volumetric capacity of PFAs 44 and 46 taken together. For example, in a prototype system 30 of the present invention, each PFA has a 7.5 gallon capacity and the reservoir 390 stores 20 gallons of solvent. The reservoir 390 may be made of any suitable material, such as steel to ASME standards for pressure vessels. The reservoir 390 includes at its hemispherical top end a standard over-pressure relief valve 392, and a control valve 394 through which pressurized air is supplied as indicated by the hollow arrow. The supplied pressure may be between about 20 psig to about 100 psig, with about 50 to 75 psig being preferred for backwash purposes in the prototype system 30 used for dry cleaning purposes. The reservoir includes an overflow port 395 connected to line 396 which limits the liquid level to the height shown represented by line 398. The backwash subsystem 50 takes filtered solvent stored in backwash reservoir 390 and delivers it via line 398 to backwash lint strainer assembly 406 which is similar in construction to forward wash lint strainer 346 and may be the same or a smaller size. The exit line 408 from strainer 406 delivers fluid to the backwash manifold/header subsystem 52. Subsystem 52 includes a T-coupling 410 leading to shut-off control valves 414 and 416 which respectively supply solvent during the backwash operation to flexible hoses 354 and 356. The overflow port 395 is closed when the backwash reservoir 390 is pressurized. The valve 104 is normally open since reservoir 390 should not be overfilled. Hose 325 leads to the clean solvent return 326 as shown in FIG. 2.

In order to fill the reservoir 390 with solvent, control valve 388 is opened during the forward filtering cycle. As solvent is added to reservoir 390, the air above the liquid in the reservoir is displaced as the liquid level rises. The air travels through overflow port 395 and shut-off valve 104 to T-fitting 420 then to conduit 422, and through T-fitting 424 and opened shut-off valve 98. Shut-off valve 98 leads to quick-disconnect couplings 78 and 88 and pipe 426 leading to the solvent vapor recovery system 430. Conduit 426 is also connected to T-fitting 424 and it collects excess vapor delivered through pressure regulator 434 located on top of condenser assembly 134. Pressure regulator 434 is set to a very low value, such as 0.5 psig to 2 psig. It acts as an over-pressure relief valve for the condenser canister 296. Note that pressure relief valve 434 will likely open when backflushed solvent is dumped through shut-off valve 210 into the still 126, because of the displacement of vapors in the reservoir due to the rising liquid level in the still. Since the dump of contaminated solvent from the housing 74 and 76 is relatively quick, typically under 60 seconds, the condenser is unable to handle all of the excess vapor. Thus, pressure relief valve 434 opens and that vapor is collected by the solvent vapor recovery system 430. Note that this is accomplished by having the still 126 be sealed against leakage even during its heating cycle to prevent the uncontrolled escape of solvent vapors to atmosphere. Since all other fittings and vessels within the system 30 are solidly piped with leak-proof joints, those skilled in the art will appreciate that the above-referenced components and piping provide for the containment and collection of all solvent vapors produced by the system 30 during all phases of its operation. In this manner, the system 30 offers the advantage of substantially eliminating exposure solvent vapors even during backwashing and distillation cycles.

Referring to FIG. 2, the remaining interconnections between the transportable liquid-cleaning system 30 of the present invention and the permanent piping and epuipment found at a process location, such as a dry cleaning establishment will be reviewed. The solvent vapor collection block 430 has been discussed. A shop air supply represented by block 450 provides pressurized air through hose 452 and coupling 454 to shut-off valve 106 located on the superstructure 38. Shut-off valve 106 is connected by suitable piping to air control system 70 shown in FIG. 1. The components within the air control system will be discussed with FIG. 3.

An optional electrical control system or panel represented by block 460 may be connected through multiple conductor cable 462 and connector plug 464 to connector receptacle 466 mounted on superstructure 38. Receptacle 466, in turn, is connected to optional electrical control system 72 shown in FIG. 1. Note that from a controls standpoint, a suitable electrical, electronic or computerized control system may be provided in block 460 mounted permanently within the building, or the same kind of control system may be mounted on structure 38 so that it is transportable with the system 30. Those in the art should appreciate that all of the shut-off and control valves within the system 30 may be manually operated or some of them may be automated, or all of them may be automated. Automation of valve operation is achievable through use of electrical solenoid operators on the valves and suitable digital control logic devices, such as programmable controllers, which are well known in the controls field for operating pneumatic and hydraulic control valves.

It is preferred, but not required, to use flexible lines, such as hoses, on one or both of the lines to which quick-disconnect couplings are attached. As the various arrangements of hoses in FIG. 2 make clear, hoses may be provided on the transportable system 30, as illustrated by hoses 325 and 330 for clean solvent return and waste water return, respectively. Alternatively, flexible hoses may be provided on the lines leading to the permanent equipment on the left side of dashed line 22, as indicated by flexible hoses 200 and 202. It is preferred to provided flexible hoses on the permanent side of dashed line 212, since connection lengths may vary from facility to facility. Further details about various substances and components, particularly those associated with the filtering apparatus will be described with respect to FIGS. 4 through 15.

Returning to FIG. 1, the dry cleaning washer system 32 to the right of dashed vertical line 21 will now be described. The system 32 includes a conventional dry cleaning washer 380 with a washer motor 382 driving a washing drum or tumbler 384. The washer 380 also includes a reservoir 386 with overflow wall 388 and level control valve 390 which, when in one state establishes a low liquid level 392 in basin 386 and when in the other state establishes a high level indicated by line 394 in basin 386.

The system 32 also includes a main tank 400, a main pump 402 driven by a main motor 404. The capacity of the main tank may be as large as desired relative to the other equipment and should include sufficient volume, in addition to the normal amount of solvent in the tank, to accept the sum of the volumes of PFAs 44 and 46 and backwash reservoir 390. In this manner, if the system 30 is ever emptied of solvent (such as happens prior to moving the system 30), there will be sufficient capacity in the main tank to accept it. The main pump 402 draws liquid through a strainer 406 and pumps it through pipe 408 and couplings 92 and 82 to the filter system 30.

Clean filtered solvent is provided by pipe 409 from a coupling 90 to a diverter control valve 410. In one state, diverter valve 410 directs clean fluid through pipe 412 into the washer basin 386. In its other state, diverter valve 410 causes fluid to be directed through pipe 414 into a sump a cylindrical housing 417 and manually openable cover 418 which normally covers the upper open end 419 of the sump 416. The clean fluid from pipe 414 enters a downward angle and swirls around the cylindrical housing 417 before passing into the reservoir 400. The opening 419 is the spot at which the operator of the dry cleaning system adds diatomaceous earth, activated carbon, additional solvent, and additives such as surfactants or sweeteners. Permanently installed line vapor conduit 421 connected to the washer 380 leads to a solvent vapor recovery system 430. Similarly, permanently installed conduit 423 leads from the main tank 400 to the vapor recovery system 430. Solvent vapor recovery is known in dry cleaning operations. The constructions of operation of washer system 32 in conventional and will not be further described, except as necessary to help explain the operation and advantages of the liquid-cleaning system 30.

FIG. 3 is schematic diagram illustrating the components found in a preferred embodiment of the air control system 70 of the present invention. As is conventional in schematic diagrams, piping is shown as a single line. Shop air at 50 to 100 psig from line 450 delivers pressure through quick-disconnect couplings 454 and 456 through shut-off valve 460 to pressure regulator 462.

The pressure regulator may be set between about 30 and about 100 psig, with 50 to 75 psig being preferred. In the prototype system 30 of the present invention, the pressure setting most preferred is 75 psig as indicated near pressure gauge 464.

Common line 466 delivers pressurized air to a first air control subsystem 468 used to regulate the raising and lowering of tie bar 62 via 60. Subsystem 468 includes a three-position five-way directional control valve 470 preferably having an integral exhaust silencer 472. Subsystem 468 also includes flow control valves 472 and 474. Flow control valve 474 is typical and includes an adjustable needle valve 476 and check valve. Energizing the "R" operator of valve 470 causes the rod 480 of cylinder 60 to be raised. Energizing the "L" operator of the directional valve 470 causes the cylinder rod 480 of cylinder 60 to be lowered. Operators "R" and "L" of valve 470 may be operated by electrical solenoid, an air-operated pilot, a manual lever or push button, as desired.

Common supply line 466 also provides pressurized air to a second air control subsystem used to power the air motor 162 in either direction of rotation, as desired. Subsystem 488 includes directional valve 490, which may be identical in construction to valve 470. Flow control valves 492 and 494 are used to regulate the speed of air motor 162 in one direction or the opposite direction. Selection of direction is achieved by actuation of the "R" and "L" operators of valve 490, so that the mixer 140 shown in FIG. 1 may be rotated clockwise or counterclockwise, as desired. This, in turn, causes the mixer 140 to rotate clockwise or counterclockwise.

The supply line 466 also provides pressurized air to a third subsystem, namely the shut-valve 394, which is preferably a normally closed, two-position, two-way control valve as shown in FIG. 3. Valve 394 is spring-returned to its normally closed position which blocks the supply of pressurized air to backwash reservoir 390. Actuating operator "C" of valve 394 shifts the valve 394 to its normally open position, thus pressurizing reservoir 390 to some maximum pressure no greater than the setting on pressure regulator 462. The pressure within reservoir 390 may be less, depending on the delivery capabilities of the backwash solvent versus the air supply. The air supply through common line 466 is preferably sufficiently great so as to positively regulate the air pressure achieved in reservoir 390, thus stabilizing the nozzle flow rates achieved in accordance with the setting of pressure regulator 462.

The air motor 362 may be replaced, if desired, by an electric motor operated by an on-off switch or the closure of a normally open relay contact or motor starter. Similarly, the air-operated cylinder 60, which raises and lowers the tie bar 62 may be replaced by an electric motor driving an acme screw through an appropriate gear reducer. Those in the art will appreciate that such changes would eliminate the need for air control subsystems 468 and 488.

Construction Details of the Permanent Filter Assembly

Figure 4:
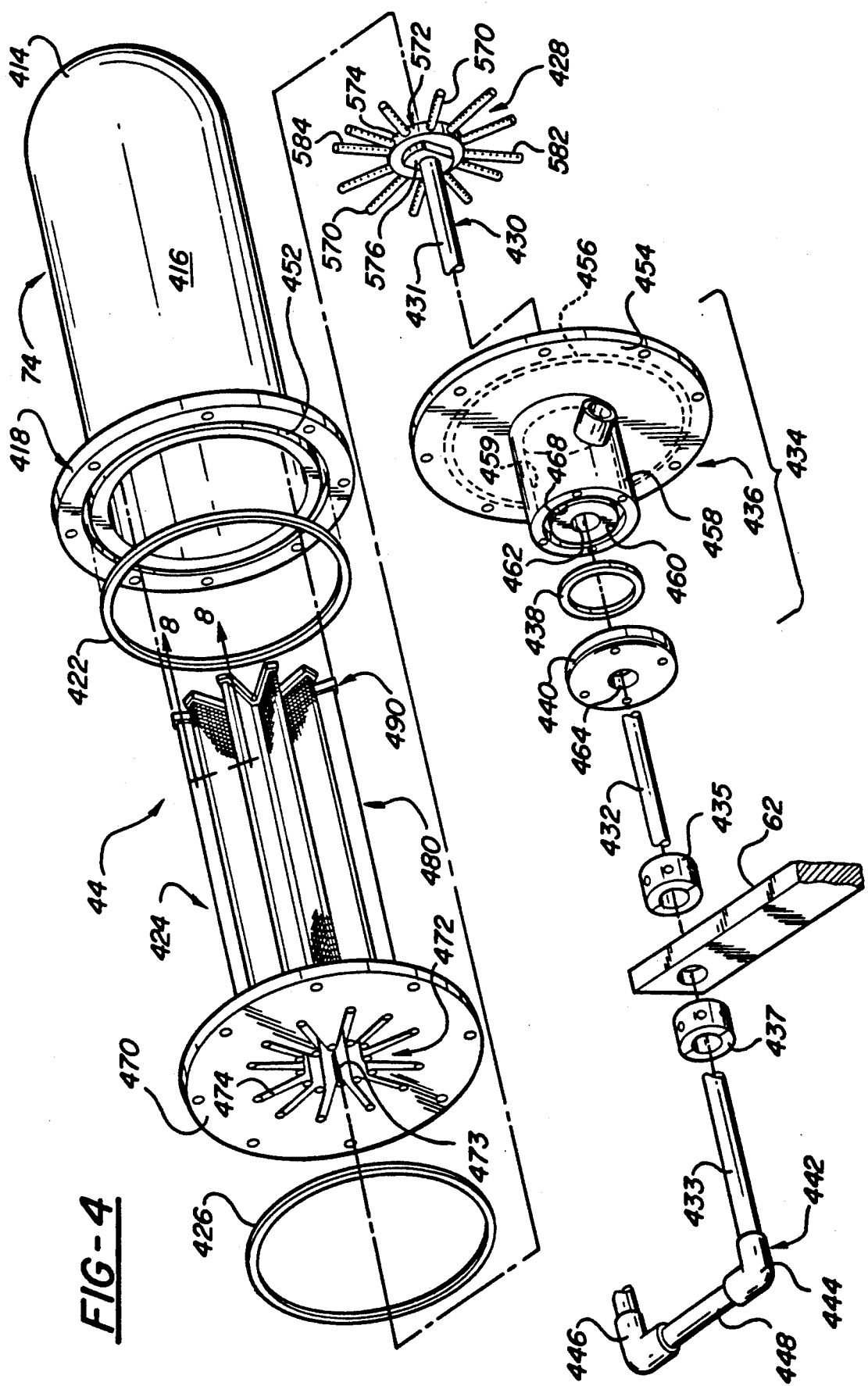
FIG. 4 is a fully exploded view of the components of one permanent filter assembly used in the FIG. 1 system.
Figure 5:
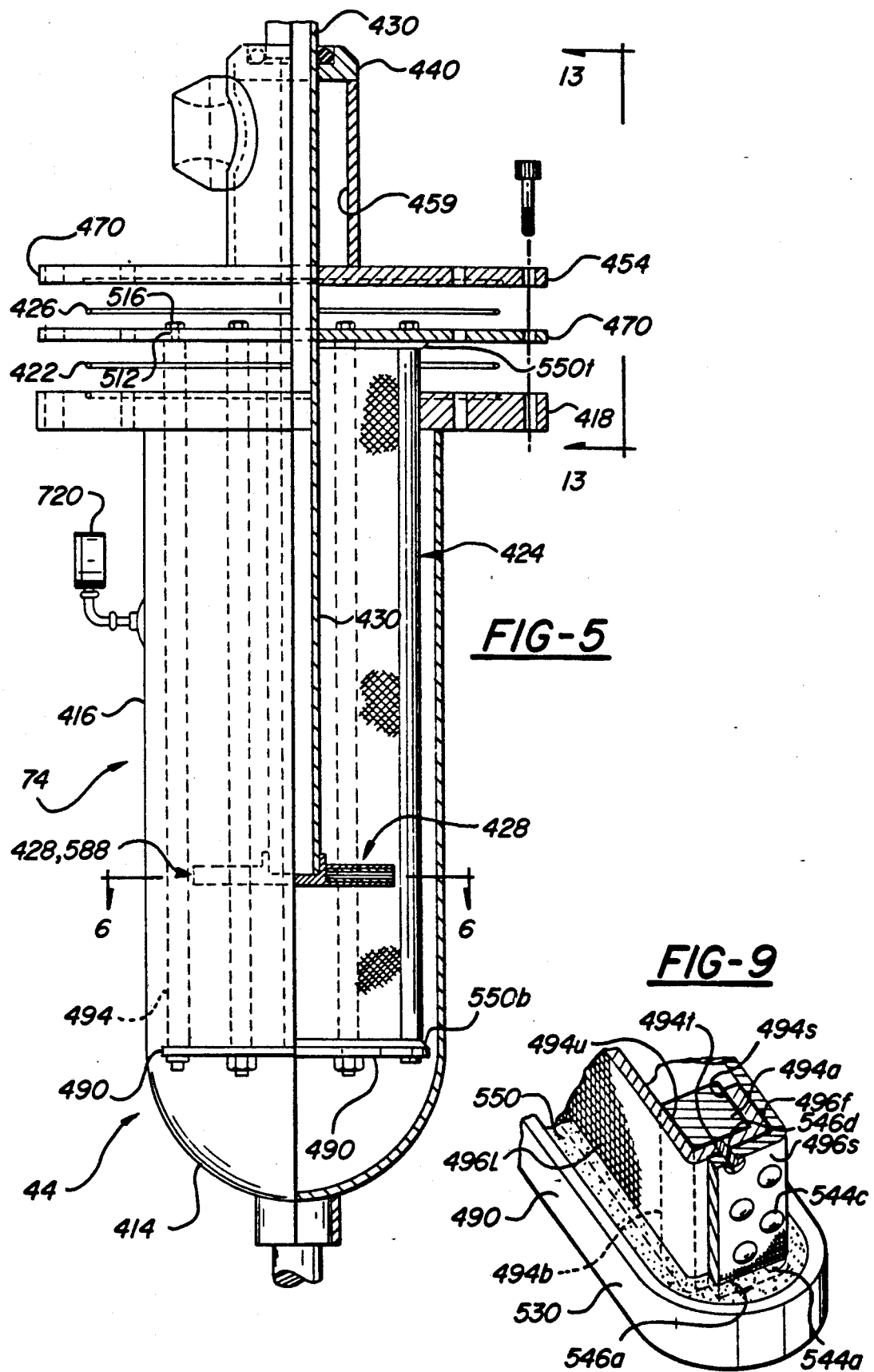
FIG. 5 is a side elevation of the permanent filter assembly of FIG. 4, partially assembled, with the right half of the filter housing broken away to illustrate how the filter cartridge assembly and reciprocating backwash/header nozzle assembly are constructed and fit together.

FIG. 4 is a simplified exploded view of several key components of permanent filter assembly 44. FIGS. 5, 13 and 15 also illustrate various portions of the permanent filter assembly. PFA 46 is identical in internal construction to PFA 44, and need not be described. PFA 44 is a pressurizable vessel which includes a steel housing 74 that has a hemispherical lower end 414, an elongated cylindrical body portion 416, and a top annular flange 418 welded to the top edge of the open end of the cylindrical portion 416. As such, the housing 74 of PFA 44 resembles an inverted bell jar. The PFA 44 also includes: a first O-ring 422; a filter cartridge assembly 424; a second O-ring 426; a sprayer nozzle structure 428 arranged in a star configuration; an elongated support pipe 430 having lower, intermediate and upper sections 431, 432 and 433; a filter cover assembly 434 including a filter cover structure 436, O-ring 438 and a top cap 440; two annular ring clamps 435 and 437 disposed on opposite sides of tie bar 62; and transverse pipe extender 442, which includes elbows 444 and 446 and extension pipe 448.

The annular flange 418 of filter housing 74 includes a groove 452 for receiving O-ring 422. The filter cover structure 434 includes a flat circular cover plate 454 including a groove 456 for receiving O-ring 426. The filter cover structure 434 also includes a generally cylindrical head section 458 which may be a substantially hollow metal casting having a cylindrical internal chamber 459 substantially closed by an upper end portion 460. End portion 460 is provided with a central bore area 462 for receiving the pipe 430, which extends through structure 434. The end portion 460 of head section 458 includes a groove 468 for receiving O-ring 438.

The filter cartridge assembly 424 includes a top cartridge plate 470 provided with a multiple-point star-shaped opening 472 having a central region 473 and multiple individual finger slots 474. The number of individual finger slots 474 may be varied as desired from four to 12 or more. A greater number of finger slots is preferred since the number of finger slots is proportional to the number of pleated sections in the filter cartridge assembly 424. The greater the number of pleated sections, the greater the usable filter surface area to volume ratio of the filter cartridge assembly 424. For ease of design and to improve the surface area to volume ratio, a higher number of finger slots, such as eight, ten or twelve are preferred. The cartridge assembly 424 also includes a filter structure 480 arranged in star configuration, whose construction will be explained with respect to FIG. 5.

The O-rings 422 and 426 represent means for sealing together the sandwich formed of the annular flange 418, the filter cartridge plate 470 and the cover plate 454, so as to prevent solvent leakage. As shown in FIG. 4, a plurality of bolt holes may be provided for clamping these three pieces together in an assembled state using bolts. The bolt holes in annular flange 418 may be threaded. Similarly, bolt holes are provided in top cap 440 and head section 458 for clamping them together.

Elongated pipe 430 preferably has a machined outer surface so as to be able to reciprocate easily through the bores 462 and 464 of head section 458 and top cap 440. The outside bottom end 431 of pipe 430 is preferably threaded to fit into a complementary threaded hole in the center of sprayer nozzle structure 428.

Ring clamps 435 and 437 are preferably of split construction, with two bolts used to tighten each clamp half to the other. The ring clamps are tightened down on pipe portion 433 on opposite sides of the tie bar 62, and thus prevent movement of the pipe 430 with respect to tie bar 62. Thus, as tie bar 62 is raised and lowered by the cylinder 60 (see FIG. 1), the sprayer nozzle assembly 428 connected to the pipe 430 is also raised and lowered with the tie bar.

Construction Details of the Filter Cartridge Assembly

The construction of an exemplary filter cartridge assembly 424 is illustrated in FIGS. 4 through 9, and will now be described in more detail. Note that assembly 424 includes twelve pleated sections, but more or less could be used. The filter cartridge assembly 424 has a top cartridge plate 470 and a bottom cartridge plate 490 interconnected in spaced relation to one another by twelve inner tie rods 492 and twelve outer tie rods 494. An elongated sheet 496 of wire mesh is wrapped about adjacent inner and outer tie rods to achieve the star configuration for the wire mesh, which features multiple uniformly oriented elongated folded sections, called pleated sections above, which are best illustrated in FIG. 4 and by the dashed lines in FIG. 6. This configuration for the filter section 480 may alternatively be described as being arranged in corrugated configuration about adjacent tie rods, so as to define an interior side or chamber and an external side or chamber. The external chamber exists between the outside of the filter cartridge assembly 424 and the bell jar housing 74. It is a generally annular chamber having a smooth bell-jar shaped external surface and an internal surface having an internal star configuration.

In one prototype embodiment of the filter cartridge assembly 424 of the present invention, the tie rods 492 and 494 are eighteen inches in length, the inner tie rods 492 are 0.375 inch in diameter and the outer tie rods are 0.500 inch in diameter. These relative diameters, in conjunction with the arrangement for the tie rods best illustrated in FIG. 6, provide an internal chamber within the sheet 496 which permits the nozzle structure 428 with its twelve finger sections to be inserted into the internal star configuration opening 472 in the top filter plate 470 and slid all the way down to the bottom cartridge plate 490 of the cartridge assembly 424. In the same prototype embodiment, the sheet 496 of mesh material is about seven linear feet long and eighteen inches high, thus providing a usable area of about ten square feet of porous filter material (not counting the areas obstructed by the tie rods). The mesh material is preferably made out of stainless steel. For most filter applications, a minimum of 1,000 openings or more per square inch is required. In dry cleaning operations using diatomaceous earth, the average size of openings is preferably 125 microns or smaller. A more preferred range of sizes is 40 to 75 microns with a range of 50 to 60 micron openings being most preferred. A typical 60 micron stainless steel mesh translates to roughly to about 10,000 openings per square inch. It will be appreciated that a filter cartridge assembly encompassing the present design could have an opening size as small as approximately 5 to 10 microns. A material mesh of this size would have applications other than the discussed dry cleaning filtering applications.

As noted above, corrugated pattern of the sheet 496 around the inner and outer tie rods is best illustrated in FIG. 6. There, the cross-sectioned lines 496C and phantom lines 496P represent the placement of sheet 496 as part of the filter. These lines show that the woven mesh material is partially wrapped around adjacent inner and outer tie rods such that the inner face of the sheet 496 is in contact with the outer side of the outer tie rods, and the outer surface of the sheet is in contact with inner side of the inner rods, thus resulting in the star configuration.

The top cartridge plate 470 includes a plurality of bolt holes 510, and a plurality of locator holes 512 for the outer tie rods, and a plurality of locator holes 514 for the inner tie rods. The locator holes 512 and 514 receive fasteners 516 and 518 which are screwed into, or pins which project out, of and are centered on the top ends of the inner and outer tie rods. The precise location of these locator holes 512 and 514 on the top cartridge plate 470 is best illustrated in FIG. 7, which is an enlarged view of a typical portion of the top cartridge plate 470. These holes 512 and 514 may also be used with any fastener that serves to precisely position the inner and outer tie rods on the plate. Any suitable fasteners 516 and 518 may also be used in any similar or suitable fashion to attach the lower plate 490 to the inner and outer tie rods 492 and 494. The configuration for lower cartridge plate 490 is best illustrated in FIGS. 4, 6 and 8.

In FIG. 7, the individual elongated finger slots 474 are shown. In a typical finger slot 474, edge tabs 520, illustrated by hidden lines in FIG. 7, are located on the underside of plate 470. These edge tabs 520 extend perpendicularly downwardly from the plate 470 and serve to prevent the upper edge of the adjacent mesh material 496 represented by heavy dashed line 496A, from being pushed into the slot 474 by positive pressure exerted by the liquid solvent, and represented by vector 522, during normal filtering operations. In FIG. 8, a similar edge tab 524 is shown on lower cartridge plate 490.

FIG. 8 is a fragmentary perspective view showing the bottom cartridge plate 490 with two inner tie rods 492A and 492B and one outer tie rod 494A installed thereon. The mesh material 496 is shown wrapped around adjacent inner and outer tie rods. Note how the lower edge 496L presses against edge tab 524. The edge tab 524 thus helps prevent movement of the lower edge 496L of the mesh material relative to the frame 490 in response to the forces exerted by the liquid pressing on the outer surface of sheet 496 during normal filter operation.

FIG. 9 is a still further enlarged view of the outer end of a finger section 532 of cartridge plate 490. FIG. 9 illustrates the overlapping relationship between first and second side edge portions 496F and 496S and how they are fastened together to substantially seal the interior volume defined by the inside surface of mesh 496 from the volume within the PFA 44 outside the mesh material 496. Note that, unlike all the other tie rods 494 which are preferably cylindrical, this outer tie rod 494B attached to finger section 532 preferably has a square cross-section to facilitate providing a zero-leakage interconnection between the first and second edge portions 496F and 496S. A preferred method for attaching the first and second edge portions of the sheet 496 will now be explained. First the first edge portion 496F is tack welded to side surface 494S or the outer surface 494T of the outer tie rod 494B, as illustrated by spaced-apart weldments 544A through 544D, which may be arranged in a straight line. Next, the sheet 496 of mesh material is wrapped in star configuration around all adjacent inner and outer tie rods as shown in FIG. 6, and the sheet is pulled by the second edge portion 496S until taut. Next, the second edge portion 496S is overlapped over the first edge side portion 496F. Then, second edge portion 496S is tack welded by individual spaced weldments 546A through 546D, preferably on the outer surface 496T or opposite side surface 494U of the outer tie rod of the 494B. This second set of weldments 546 weld through the first side portion 496F to the outer tie rod 494B. In a prototype of the filter cartridge 424 of the present invention, the weldments 544 were spaced approximately one-half inch from one another in a straight line and the weldments 546 were spaced one-half inch from one another along the same straight line. Thus adjacent alternating weldments 544 and 546 were spaced approximately one-quarter inch from one another along this line. A substantially leak-proof overlapping of first and second side edge portions 496F and 496S was achieved, thus forcing all liquid to be filtered to flow through the filter mesh material.

FIG. 9 also shows a preferred sealing means for preventing solvent from seeping through at the lower edge 496L indicated in FIG. 8 by multiple X's. This edge leak in FIG. 8 is preferably sealed with a conventional two-part epoxy adhesive which, when mixed together, adheres to the stainless steel sheets 496 and the metal surface of lower cartridge plate 490. Any conventional or suitable adhesive material which can be applied as a bead in a soft state and hardens into a permanent shape or substantially film but pliant state and which is impervious to the liquid solution to be filtered can be used. A bead 550 of this kind of epoxy adhesive is shown in FIG. 9 sealing the leakage path beneath edge 496L and the surface of finger section of plate 490. The bead 550 may be of any suitable thickness. This kind of adhesive bead 550 is placed around the entire outside perimeter of the lower and upper edges of sheet 496 where the mesh material meets the top and bottom filter cartridge plates 470 and 490. This is illustrated by continuous beads 550T and 550B in FIG. 5.

Those in the art will appreciate that other means for sealing the leakage paths between the upper and lower edges of the sheet 496 and the filter plates may also be used, as long as a zero-leakage seal is established. Similarly, other techniques for coupling the side edge portions 496F and 496S of filter sheet 496 may be used.

Construction Details of the Sprayer Nozzle Structure

FIG. 4 shows a nozzle structure 428 having a plurality of elongated finger sections 570 extending radially outwardly from a central manifold section 572 having a disc-shaped portion 574 and an oblong pipe connection section 576. The lower end portion 431 of elongated pipe 430 is fastened into a centrally located bore formed in the oblong section 576, which is in fluid communication with an internal distribution manifold or chamber leading to individual elongated chambers inside of each finger section. The elongated finger sections 570 are equiangularly spaced from one another in a common plane which is perpendicular to the axis of the elongated pipe 430. Finger sections 570 correspond in number to the number of elongated finger sections 474 of opening 472 in filter cartridge plate 470. The finger sections 570 may each be separately made, and then threaded or otherwise fastened into radially arranged bores in the circumferential edge of disc 574, as suggested by FIG. 4.

The finger sections 570 are slightly smaller in width than the openings 474 for clearance purposes. In the prototype permanent filter assembly 44 of the present invention, which is about ten inches in diameter across the housing 74, the finger sections 570 have a total clearance of less than 0.2 inches, which means less than 0.1 inch per side. In the prototype, this clearance is in the range of 0.05 inch to about 0.10 inch between the finger section 570 and the adjacent edge of the elongated finger section 474 of opening 472. This same basic clearance, noted as clearance 580 shown in FIG. 12, is maintained between the inner surface of sheet 496 and the finger sections 570.

In FIG. 4, the elongated finger sections 570 are shown to have a substantially cylindrical shape. Finger sections 570 are provided with first and second sets of tiny spaced openings on opposite sides of the finger sections in the general plane of the nozzle structure 428. These openings may have a diameter in the range of 0.01 inches to about 0.05 inches or more, and may be spaced apart from one another as a distance approximately equal to one to five times the average diameter of the holes. While these two sets of diametrically opposed tiny holes may prove suitable for cleaning permanent filters 424 in some applications, tests have shown that they do not do a completely satisfactory job of cleaning filter bed materials like a mixture of diatomaceous earth and activated carbon powder caked onto a stainless steel mesh sheet 496. For this more demanding application, an improved nozzle structure 588, illustrated in FIGS. 6, 10, 11 and 12, was developed and will now be described. Note that because the overall geometry of sprayer nozzle structures 428 and 588 are essentially the same when viewed in transverse cross-section, and since both have a central bore in their manifold section for receiving elongated pipe 430, they are physically interchangeable with one another. Since the elongated chambers within finger sections 572 and the central distribution chamber of nozzle structure 428 are similar in arrangement and performance to those in nozzle structure 588, only those internal chambers of structure 588 will be described, since they are fully illustrated in the Figures discussed below.

Construction Details of Improved Nozzle Structure 588

Nozzle structure 588 produces multiple thin sheets of liquid flowing at high velocity from very thin elongated slots which take the place of holes 582 and 584 shown in the finger sections 570 of nozzle structure 428. These thin sheets emanating from the slots of nozzle structure 588 do a much better job of cleaning diatomaceous earth and activated carbon off of filter bed sheet 496 of the filter cartridge assembly 424 than do the multiple individual streams emanating from holes 582 and 584.

Referring now to FIGS. 6 and 10, it may be seen that nozzle structure 588 is made of two major pieces, namely a very squat base plate member and a flat cover plate 594. Members 592 and 594 are preferably formed of a suitable metal such as stainless steel casting or a powdered metal alloy casting, that is then finished machined into the desired shape. Both members 592 and 594 have a major plane that is transverse to the central axis of the pipe 430. Structure 588 has an enclosed central manifold section 596 and twelve elongated finger sections 600 extending radially outwardly from the central manifold section 596 and equally equiangularly spaced from one another in a common transverse plane.

Each elongated finger section 600 has a top wall portion 602 which is part of the cover plate 594. Each finger section 600 also has a bottom wall portion 604 and two opposed side wall portions 606L and 606R, and an enclosed end portion 610, which are all part of the base member 592. Each finger section 600 also has two opposed elongated slots 612 provided by machining away a very thin part of the top of opposed side wall portions 606. FIG. 12 shows the outer portion of an exemplary finger section 600 with its opposed side wall portions marked by reference numerals 606L and 606R and its opposed slots identified by numerals 612L and 612R.

As best shown in FIGS. 6 and 10, the nozzle structure 588 has formed in base member 592 a central manifold chamber 614 and 12 elongated chambers 620. The elongated chamber 620 in each elongated finger section is enclosed by the bottom wall portion 604, the two opposed side wall portions 606 and the enclosed end portion 610. The chamber 620 is in open fluid communication with the central chamber 614. The fluid flow capacity of each elongated chamber 620 in the finger section 600 is significantly greater than the fluid flow capacity of the two opposed slots 612 in each finger section. Thus when liquid is provided via pipe 430 to the central manifold chamber 614 of nozzle structure 588, all of the slots 612 in the finger sections 600 present a high resistance to fluid flow, thereby enabling back pressure to develop in each elongated chamber 620 so as to expel liquid equally from each of the slots 612 in the finger sections 600 and at relatively high velocity.

FIG. 6 shows that the central manifold chamber 614 of nozzle structure 588 is bounded by twelve interfinger web sections 622 equiangularly spaced about the manifold area within a common annular region centered about the central axis. The web sections 622 are found in an annular region 626 surrounding the pipe 430 and in an annular region 626 in the central section 596 of the base member 592. The portion of the web sections 622 in the base member 592 support the cover plate. The cover plate 594 is rigidly fastened to the base 592 at the inside region 626 by fasteners 628 and in region 626, fasteners 630 in holes 634 and 636 found at the outer ends of the finger sections 600 in the cover and base members 592 and 594, respectively. Fastener 628 is most clearly shown in FIG. 10, and fastener 630 is most clearly shown in FIG. 11.

In nozzle structure 588, each slot 612 has a longitudinal dimension in a generally radial direction that is about 30 to 75 times larger than the height of the slots (i.e., the dimension parallel to the central axis of pipe 430. In particular, it is preferred to have a longitudinal dimension for the slot that is at least 50 times larger than the slot's height dimension. The typical height of the slot 612, illustrated as dimension 632 in FIG. 11, is preferably no greater than 0.05 inch. Smaller dimensions, such as 0.03 inch or 0.015 inch are preferred. A slot height of no greater than 0.010 inches was used in the prototype nozzle structure 588 of the present invention with very successful results for the geometry previously described, and thus is most preferred for the prototype PFA 44.

The geometry of slots 612 was further developed to ensure complete cleaning of those portions of sheet 496 adjacent the outer tie rods 494. This preferred geometry is illustrated in FIG. 12. Arrows 634 illustrate the general direction of the two opposed thin elongated continuous streams of liquid produced by slots 612L and 612R of a typical elongated finger section 600. Arrows 636L and 636R indicate how the flow in the vicinity of end portions 610 of the finger section is directed outwardly to clean edge regions 633 in the vicinity of and running the length of outer tie rod 494. This improved cleaning action of region 633 of sheet 496 was achieved by smoothly grinding away the triangular regions 640L and 640R of the base member at each finger section 600, which has been stippled in FIG. 12 for identification purposes. This improved machining for slots 612 helped assure virtually 100 percent cleaning of the permanent filter material 496, especially adjacent the outer tie rods.

Construction Details of Filter Cover Assembly 434

FIGS. 4, 5, 13 and 14 show the preferred construction for the filter cover assembly 434. Assembly 434 was described in some detail with respect to FIG. 4. Thus only additional details not previously mentioned will be described. FIGS. 13 and 14 show the internal construction of head section 458, and how fluid from the internal chamber within filter cartridge assembly 424 exits the cartridge through a plurality of holes 650 located about a central bore 652 in the filter cover plate 454 and thereafter are conveyed through to horizontal plate 372, as shown in FIG. 1 and in FIG. 13. The elongated pipe 430 supporting the nozzle structure 428 or 588 for reciprocation is supported by a bushing 656 which is press-fit into the bore 658 in the head section 458. A spring loaded elastomer gasket 672 is provided in the head section 458 around the pipe 430 to prevent leakage of solvent passed bore 464 in the cap 440.

Those in the art will appreciate from FIG. 13 that the pipe 430 is thus confined in all radial directions by the bore 462 of bushing 656 and the central bore 652 in filter cover plate 454. Since pipe 430 is supported in two distinct places, this helps ensure that the nozzle structure 428 or 588 remains centered on the axis of filter cartridge assembly 424 as the nozzle structure is moved up and down by the lift mechanism 62 during the backwash cycle. During the normal filtering operation, the pipe 430 is in its lowered position as shown in FIG. 13. The split ring 435 rigidly clamped onto the upper portion 433 of pipe 430 prevents the pipe 430 from going down any further. During the backwash cycle, the nozzle structure 428 or 588 is raised and lowered once at a predetermined rate of travel, as will be further explained.

The dashed arrows 680 indicate the direction of filtered liquid flowing out of the cartridge 424 into the chamber 459 of the head section 458. Dashed arrow 682 illustrates that the filtered liquid then flows out a hole 684 which is threaded and supports pipe 686 leading to coupling 374. As shown in FIG. 13, top cover plate 454 of cover assembly 434 includes a cylindrical recess 690 which is in fluid communication with the holes 650. Recess 690 is located above cover plate 470, and provides the necessary pathway for fluid flowing out of the star configuration opening 472 in plate 470 to permit the slots 474 to be drained directly. To ensure minimum resistance to fluid flow, the combined area of the eight bores 650 and filter plate 654 preferably exceeds the fluid flow capacity of bores 684 and horizontal pipe 372 by a factor of 1.5 or more. This also ensures that there is no appreciable pressure buildup inside of filter cartridge 424 during normal filtering operation. By having the liquid pressure within the internal chamber of the filter cartridge 424 and chamber 459 of filter cartridge assembly 434B as low as possible, the pressure differential existing across the filter bed formed on filter sheets 496 is maximized, which results in maximum throughput from the PFA 44.

Construction Details for Backwash Manifold and Hose Assembly 52

FIG. 15, in conjunction with the FIGS. 1, 2 and 13, completely illustrate the essential features of the backwash header and delivery subsystem 52. Details of the subsystem 52 not previously described will now be discussed, particularly with reference to those components associated with PFA 44. As can be seen in FIG. 15, these piping and hose interconnections to PFA 46 are identical to those for PFA 44, but simply flipped in a mirror image around an imaginary transverse vertical plane equidistant between the two pressure vessel housings 74 and 76. As previously described, the backwash liquid from reservoir 390 is delivered via a conduit 408 to a T-coupling 410 representing the beginning of the backwash manifold. Thereafter the liquid is equally divided and flows through control valves 414 and 416 leading to hoses 54 and 56 respectively. The control valves 414A and 416A in FIG. 15 are shown as the manually operated type, since each has a hand lever. As previously described, the backwash liquid in hoses 54 and 56 runs into the central pipe of the sprayer nozzle assemblies 64 and 66, the liquid is then sprayed out through the slots in each nozzle structure at the inside surface of the filter sheet in each filter cartridge to produce the localized high velocity cleaning of the mesh filter. Note that this technique for backwashing not only uses relatively low flow rates, but it also does not significantly raise the pressure inside of filter cartridge 422.

In order for the backwash liquid to reach hoses 54 and 56, control valve 414 and 416 must be open. At the same time the backwash liquid is being delivered through hoses 54 and 56 to the sprayer nozzle assemblies, the lift mechanism 58 is cycling up and down at a controlled rate of speed determined by the settings of the flow controls 472 and 474 shown in FIG. 3. The arrow 690 in FIG. 15 represents the tie bar 62 being raised, which simultaneously raises the sprayer nozzle assemblies 64 and 66, as indicated by arrows 692. The horizontal extender pipe 442 ensures that the hose 54 is able to hang vertically downward from elbow 446. This ensures that the top filter plate 454 does not interfere with the vertical movement of hose 54.

Another important feature of the subsystem 52 shown in FIG. 15 is that two end portions 694B and 694E of hose 54 are spaced apart from one another horizontally to ensure that hose 54 has a very generous bending radius, so that it can be freely raised up and down without generating any significant lateral forces that are applied to the elbow 446. In the prototype subsystem 52 of the present invention, the two ends 694B and 694E are about 18 to 24 inches apart.

To further ensure that the torsional forces are not unnecessarily applied through hose 52, a swivel coupling 704 is used at the end 694B of hose 54. A similar swivel coupling 706 is used at the end 696B of hose 56. These couplings 704 and 706 respectively allow hose ends 694B and 696B to move freely in a vertical plane parallel to the major axis of tie bar 62. This freedom of movement in the vertical plane is indicated by arrows 708 and 710 in FIG. 15. Those in the art will appreciate that this tandem arcuate hose assembly arrangement with swivel couplings for providing movement in one vertical plane, while providing clearance from the housings 74 and 76 through use of extender pipes such as pipe 442 perpendicular to this vertical plane, represents an efficient use of space which provides for maximum free movement of the two hose assemblies in a compact space, without interfering with one another.

In FIGS. 13 and 15, conventional pressure gauges 714 and 716 are shown tapped into the backwash lines on the top of the PFAs, for example, at elbow 444. Similarly, pressure gauges may be provided in any other line or reservoir to monitor any pressure desired. For example, in FIG. 5 pressure gauge 720 is used to monitor upstream pressure of dirty liquid in the outer chamber of housing 74.

Operation of the Liquid-Cleaning System

Those skilled in the field of designing and manufacturing liquid filtering systems will very likely understand all points necessary to operate the liquid-cleaning system 30 of the present invention in its proper sequence without any further explanation. Nevertheless, the general sequence of operation will now be discussed.

When the filtering system is first used, the main pump 402 in the washer system 32 is turned on. This forces liquid to flow through couplings 92 and 82, through pipe 342, through lint strainer 346, up pipe 358 into pipe 362, which leads to the bottom of housings 74 and 76 of permanent filter assemblies 44 and 46 respectively. Next, this unfiltered liquid presses through the sheets 496 to filter material in the filter cartridges of PFAs 44 and 46. The filtered liquid emerges from the top cover assemblies at couplings 374 and 376. Then the filtered liquid travels along pipe 378 through sight glass 380 and shutoff valve 100 and couplings 80 and 90 to pipe 409 in the washer system 32. Then diverter valve 410 directs the flow either to the sump 416 in the main tank 400 or to the washer 380 through pipe 412. After the filtered liquid has run through the washer 380, it is also returned to the main tank 400.

To establish the bed of filter material on the filter sheets 496 in the PFAs, appropriate amounts of diatomaceous earth and activated carbon are added to the sump 416. After a few minutes of operation of main pump 402, these two substances deposit themselves in a bed upon the filter sheet 496 in each PFA. Those in the art will appreciate that with a 60 micron mesh screen, the diatomaceous earth will be caught first by the filter screen, and then the activated carbon particles, which are much finer, will be caught by the layer of diatomaceous earth forming on the filter. Because the liquids follow the path of least resistance through the filter, the earth and activated carbon deposit themselves quite uniformly on the two filters, so that a relatively uniform thickness and filtering action is achieved on all active porous areas of the filter beds in the PFAs 44 and 46.

The main pump 402 remains on continuously. Load after load of clothing may be dry cleaned in the washer 380. After a suitable amount of clothing has been washed (as determined by weight and degree of soiling in accordance with professional dry cleaning standards), the dry cleaning liquid solution, composed primarily of perc, will need to be cleaned through distilling. At the same time the filter bed materials previously added to the filtering system must now be discarded and replaced with new materials. This is because the diatomaceous earth and in particular the activated carbon have accumulated or absorbed various known contaminants such as dirt, natural acids, odors and the like. In order to clean the permanent filter cartridges in PFAs 44 and 46, the system 32 must be put through its backwash cycle.

Before beginning the actual backwashing, the backwash reservoir 390 must be filled, if this has not already been done. Filling reservoir 390 is accomplished by opening valve 388 when the main pump 402 is running. Filter liquid in line 372 will travel through coupling 384 and open valve 388 into backwash reservoir 390. Once filled up to line 398, which is the level of the overflow port 395, the shutoff valve 388 is closed and the shutoff valve 104 associated with the overflow port 395 is closed. Next, air valve 394 is opened, allowing pressurized air, preferably at 50 to 75 psig, to flow into the backwash reservoir 390. The main pump 402 is turned off. Also shutoff valve 100 is closed.

Once the air pressure backwash reservoir 390 has stabilized, the valve 414 and 416 in the backwash manifold are opened, and at about the same time valve 210 leading to the still is opened. Pressurized backwash liquid then runs through the backwash manifold subsystem 52, through hoses 54 and 56 to the pipes 30 leading to the sprayer assemblies. At about the same time, directional control valve 470 is operated to first raise the tie bar 52, thus raising the sprayer nozzle assemblies as well in the PFAs. When cylinder rod 80 reaches the top of its stroke, the control valve 470 switches state to lower the tie bar 62. This lift mechanism cycle just described preferably takes 10 to 40 seconds to complete, with about 20 to 25 seconds being preferred. This represents 10 to 12.5 seconds for the raising of the tie bar, and about an equal amount of time for lowering the tie bar.

During this backwash cycle, all of the filter bed material forced off the filter sheets 496 in each PFA is carried by action of gravity into the still 126. Once all of the backwash liquid in reservoir 390 has been used, the system 30 can be restored to its original starting condition. In other words, valve 212 leads the still 126 is closed. Backwash fill valve 3 and backwash inlet supply 414 and 416 are closed, and overflow port valve 104 and valve 100 is opened.

Note that the still may now be operated in a conventional sequence, known to those in the art which need not be described here. The prototype still of the present invention takes approximately two hours to completely evaporate the 35 gallons of solvent. Note that if the main tank 400 has a sufficient amount of liquid solvent in reserve, the filtering of the dry cleaning solvent may be continued and the washer system 32 may be operated, even as the still is processing the spent solvent.

The pressure filter assemblies 44 and 46 are preferably operated with a differential pressure across each filter sheet 496 equal to 8 to 18 psig or more. Higher flow rates are obtained by higher differential pressures in the preferred range of 12 to 18 psig.

After studying the drawings and foregoing description, various modifications, alterations and additions to the preferred embodiments discussed above, beyond those variations already mentioned, will be readily apparent to persons skilled in the art. Accordingly, it is to be understood that the present invention is not limited to the specific embodiments and methods described above, but should be deemed to extend to the subject matter defined by the appended claims, including all fair equivalents thereof.

I claim:

1. A pressurizable filter cartridge apparatus having a central axis and a sheet of permanent mesh filter bed material arranged in a star configuration for increasing the ratio of surface-area-to-unit-volume of the cartridge apparatus, comprising:

a top cartridge plate provided with at least four elongated openings arranged in a star configuration;

a bottom cartridge plate having at least four elongated finger sections arranged in star configuration;

a plurality of outer tie rods for interconnecting the top and bottom cartridge plates, the outer tie rods being arranged concentrically about the central axis, with each outer tie rod being coupled to the bottom cartridge plate at an outer end portion of an elongated finger section thereof, cartridge plate and coupled to a portion of the top cartridge plate adjacent a respective one of the elongated slots at and outer end thereof;

a plurality of inner tie rods for interconnecting the top and bottom cartridge plates, with each such tie rod being connected to the bottom cartridge plate at a respective interfinger web section thereof and to the top cartridge plate at an inside web between two adjacent openings;

a sheet of permanent filter bed material arranged in a star configuration so as to have a number of pleated sections, the pleated sections passing on the outer sides of the outer tie rods and inner sides of the inner tie rods and forming an enclosed inner volume extending between the top and bottom filter cartridge plates; and top sealing means, for closing leakage paths between a top edge of the sheet of filter bed material and the top cartridge plate; and bottom sealing means for closing leakage paths between the bottom cartridge plate and a lower edge of the sheet of filter bed material, the cartridge plates, tie rods, sheet of permanent bed material, and sealing means all being arranged, sized and interconnected in a manner which enables the filter bed material to be backwashed by liquid flowing from the enclosed inner volume through the sheet of filter bed material.

2. A filter cartridge apparatus as in claim 1, further comprising:

fastening means for securing the inner and outer tie rods to the top and bottom cartridge plates, and wherein:

the top cartridge plate has at least twelve elongated openings, the number of outer tie rods is at least twelve, the number of inner tie rods is at least twelve, and the axial dimension of the filter cartridge assembly is about at least twice the inner filter cartridge assembly.

3. The filter cartridge apparatus as in claim 1, wherein:

the filter bed material is a woven cloth having an average size of openings no greater than about 60 microns, and the overall outer surface area of the filter bed material is at least eight square feet.

4. A filter cartridge apparatus as in claim 1, wherein:

the top and bottom sealing means are a nonmetallic adhesive material impervious to conventional dry cleaning solvent, and the top cartridge plate includes elongated edge tab portions arranged substantially perpendicularly to the plane of the top cartridge plate.

5. A filter cartridge apparatus as in claim 1, wherein:

the cartridge plates and tie rods are sufficiently strong to withstand a sustained continuous pressure drop across the filter bed materials of at least 15 psig, and the top cartridge plate includes a plane surface and includes a plurality of rigid members adjacent the elongated openings extending transversely outwardly from the top cartridge plate in a direction transverse to the plane for supporting the permanent bed material to prevent the material from collapsing into the finger slots when the filter cartridge apparatus is used under the aforementioned pressure drop across the mesh material.

6. A filter cartridge apparatus as in claim 1, further comprising a filter case assembly, which includes:

a filter housing provided with a substantially cylindrical side wall section and a substantially closed end section and an open end section having an annular flange; and a filter cover assembly including a filter cover having a substantially flat surface which engages upon the annular flange of the filter housing.

7. A filter assembly having a central axis and a permanent sheet of metal mesh material arranged in star configuration around the central axis, comprising:

a top frame structure;

a bottom frame structure;

a plurality of inner tie rods concentrically arranged about a central axis and rigidly interconnecting the top and bottom frame structures;

a plurality of outer tie rod members concentrically arranged about the central axis of the apparatus and coupling the top and bottom frame members;

a permanent backwashable sheet of woven metal mesh material having an inner and outer surface and a large generally porous region having myriad openings with a density of no less than about 1,000 openings per square inch, the sheet of woven mesh material being partially wrapped around the adjacent inner and outer tie rods such that the inner surface of the sheet is in contact with the outer tie rods, and the outer surface of the sheet is in contact with the inner tie rods, thereby giving the sheet a star configuration when viewed in a cross-section perpendicular to the central axis; and means for sealingly attaching the sheet of woven mesh material to the top and bottom frame structures to form an inner volume within the inner surface of the sheet that is substantially sealed from a volume on the opposite side of the sheet, except through the myriad openings in the porous region of the sheet.

8. The filter assembly as claimed in claim 7 wherein the mesh material includes upper and lower edge portions in contact with the means for sealingly attaching, and first and second side edge portions extending between the top and bottom frame structures adjacent to a selected one of the tie rods, the first and second side edge portions comprising a narrow strip of mesh material no more than about twice the cross-sectional width of the selected tie rod, and the filter assembly further comprises:

means for attaching the first and second side edge portions together to prevent liquid from passing around the first and second side edge portions of the sheet without passing through the sheet.

9. The filter assembly as claimed in claim 8, wherein at least part of the means for attaching the first and second side edge portions of the sheet of material are overlapping and in contact with one another.

10. The filter assembly as claimed in claim 9, wherein the means for attaching includes weld means having several distinct tack weldments spaced apart from one another along a common line parallel to the central axis of the filter cartridge.

11. The filter assembly as claimed in claim 9, wherein the means for attaching includes a first set of weldments for securing the first side edge portion to a selected outer tie rod along a common line on the selected outer tie rod, and
  second set of weldments for securing the second side edge portion to the first edge portion, which second set of weldments are distinct from the first set of weldments.

12. The filter assembly as claimed in claim 8, wherein the selected tie rod is one of the outer rods, and second set of edge portions overlap one another adjacent the selected tie rod, and
  the means for attaching includes a plurality of weldments spaced along the overlapping first and second side edge portions.

13. A filter assembly as in claim 15, further comprising:
  a nozzle structure having a common manifold section provided with a common distribution chamber and at least a plurality of finger sections spaced from one another and each having a common elongated fluid supply chamber and a plurality of small orifices for allowing liquid to squirt outwardly therefrom under back pressure applied to the liquid through the common distribution chamber; and
  a reciprocable structure for supporting the nozzle structure for movement back and forth while keeping the small orifices of the finger sections of the nozzle structure in close proximity to the sheet of mesh filter material.

14. The filter assembly as claimed in claim 13, wherein the reciprocable structure extends through one of the top and bottom frame members, and has a hollow passageway extending therethrough to deliver liquid under pressure to the common distribution chamber of the nozzle structure to backwash the sheet of mesh material.

15. A filter assembly as in claim 13 further comprising a filter case assembly, which includes:
  a filter housing provided with a substantially cylindrical side wall section, a substantially closed end section and an open end section having an annular flange around an opening; and
  a filter cover structure including a flat filter cover plate which rests upon the annular flange of the filter housing.

16. A filter assembly as in claim 7 included in a permanent liquid filter system including the capability of backwashing the filter assembly, said filter assembly further comprising a reciprocable structure, wherein the reciprocable structure includes an elongated central fluid supply member having a fluid passageway interconnected to the common manifold section to deliver liquid thereto, and the system comprises:
  a manifold assembly having a main fluid supply member and at least one branch fluid supply member extending outwardly therefrom, with each fluid supply member having a passageway therethrough, and with the branch supply member being in fluid communication with the central fluid supply member of the reciprocable structure;
  at least one pressure vessel for housing the filter assembly, the pressure vessel including a filter cover and a housing having a substantially cylindrical portion and an open end which is covered up by the filter cover, and the central fluid supply member extends through the filter cover into the filter assembly for reciprocal movement relative to the filter cover and filter assembly.

17. The filter assembly as in claim 16, wherein the first branch member includes at least one flow control member for selectively permitting and shutting off liquid flow through the first branch member.

18. The filter assembly as in claim 16, wherein the manifold assembly further includes a flexible fluid supply member for carrying liquid interconnected between the branch fluid supply member and the central fluid supply member of the reciprocable structure.

19. The filter assembly as in claim 16, wherein the manifold assembly further includes a flexible fluid supply member for carrying liquid interconnected between the branch fluid supply member and the central fluid supply member of the reciprocable structure.

20. The filter assembly as in claim 16, wherein the central supply member of the reciprocable structure is an elongated cylindrical pipe located concentrically to the axis of the filter assembly.

21. A filter cartridge apparatus as in claim 20, wherein:
  the filter cover assembly is arranged to receive a reciprocating fluid delivery member; and
  the filter cover having a filter cover plate, a central bore for receiving the fluid delivery member, and a plurality of fluid ports arranged therearound for delivering fluid;
  a generally cylindrical head section having an inner fluid passage, at least one port communicating with a wall of the head section, and a guide means for receiving the fluid delivery member; and
  a generally cylindrical pressure cap mounted to the generally cylindrical head section.

22. A filter cartridge apparatus as in claim 20, wherein the fluid delivery member reciprocates with respect to the filter cover assembly, and wherein
  the combined area of the plurality of ports and the cover plate is greater than the area of the port and the cylindrical head.

23. The system as in claim 16, wherein the reciprocating high pressure fluid assembly includes:
  a plurality of fluid delivery means for delivering fluid to each pressure vessel;
  tie bar means having at each end a hole for receiving a fluid delivery means, the fluid delivery means having a first end and a second end;
  first and second transverse conduit means, each such transverse fluid conduit means having a first and second elbow members, the first end of each conduit means being connectable to the second end of the fluid supply member, the second end of each conduit means being connectable to one end of each fluid delivery means;
  high pressure nozzle means connected to the other end of the fluid delivery means;
  reciprocating means connected to the tie bar means for transversely moving the high pressure nozzle means in the filter assembly; and
  means for fixing the tie bar means relative to the fluid delivery means.

24. The system as in claim 16 wherein the reciprocating high pressure fluid assembly moves independently of the manifold assembly and the filter assemblies.

25. The system as claimed in claim 16 wherein the manifold assembly includes at least one valve means for controlling the flow of fluid through the manifold assembly.

* * * * *

UNITED STATES PATENT AND TRADEMARK OFFICE
CERTIFICATE OF CORRECTION

PATENT NO. : 5,203,998
DATED : April 20, 1993
INVENTOR(S) : Robert Benian

Page 1 of 2

It is certified that error appears in the above-indentified patent and that said Letters Patent is hereby corrected as shown below:

Column 1, lines 37-38, "perchlorethylene" should be --perchloroethylene--.

Column 1, line 43, "thing" should be --thin--.

Column 1, lines 59-60, "perchlorethylene" should be --perchloroethylene--.

Column 2, line 42, "a" should be --as--.

Column 2, line 50, "commintments" should be --commitments--.

Column 3, line 45, "upcoupling" should be --uncoupling--.

Column 4, line 53, after "structure" insert --is--.

Column 9, line 42, "unites" should be --units--.

Column 10, line 12, "member" should be --members--.

Column 13, line 11, "provided" should be --provide--.

Column 13, line 44, after "sump" insert --416 comprised of--.

Column 18, line 22, "film" should be --firm--.

Column 19, line 12, "as" should be --at--.

Column 20, line 42, after "430" insert --)--.

UNITED STATES PATENT AND TRADEMARK OFFICE
CERTIFICATE OF CORRECTION

PATENT NO. : 5,203,998
DATED : April 20, 1993
INVENTOR(S) : Robert Benian

Page 2 of 2

It is certified that error appears in the above-indentified patent and that said Letters Patent is hereby corrected as shown below:

Column 24, line 27, after "126" insert --which--.

Column 25, line 6, Claim 1, "and" should be --an--.

Column 27, line 14, Claim 13, "15" should be --7--.

Signed and Sealed this

Twelfth Day of April, 1994

Attest:

BRUCE LEHMAN

Attesting Officer

Commissioner of Patents and Trademarks